US009104662B2

(12) United States Patent
Srihari et al.

(10) Patent No.: US 9,104,662 B2
(45) Date of Patent: Aug. 11, 2015

(54) METHOD AND SYSTEM FOR IMPLEMENTING PARALLEL TRANSFORMATIONS OF RECORDS

(75) Inventors: Vinay H Srihari, San Mateo, CA (US);
Jia Shi, Redwood City, CA (US);
Jonghyun Lee, Sunnyvale, CA (US);
Roger Hansen, San Francisco, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 953 days.

(21) Appl. No.: 12/188,521

(22) Filed: Aug. 8, 2008

(65) Prior Publication Data

US 2010/0036861 A1  Feb. 11, 2010

(51) Int. Cl.
*G06F 17/30* (2006.01)
(52) U.S. Cl.
CPC ...................................... *G06F 17/30* (2013.01)
(58) Field of Classification Search
CPC combination set(s) only.
See application file for complete search history.

(56) References Cited

U.S. PATENT DOCUMENTS

| 5,832,519 | A * | 11/1998 | Bowen et al. ........................ 1/1 |
| 5,892,900 | A * | 4/1999 | Ginter et al. .................... 726/26 |
| 6,757,769 | B1 * | 6/2004 | Ofer .............................. 710/200 |
| 7,020,835 | B2 | 3/2006 | Loaiza et al. |
| 7,039,773 | B2 | 5/2006 | Hu et al. |
| 7,231,564 | B2 | 6/2007 | Loaiza et al. |
| 2002/0049950 | A1 | 4/2002 | Loaiza et al. |
| 2003/0009538 | A1 * | 1/2003 | Shah et al. .................... 709/219 |
| 2006/0173926 | A1 * | 8/2006 | Kornelson et al. ............ 707/200 |
| 2007/0198437 | A1 * | 8/2007 | Eisner et al. .................... 705/79 |
| 2007/0198656 | A1 * | 8/2007 | Mazzaferri et al. ........... 709/218 |

OTHER PUBLICATIONS

Lee et al.: "Active Buffering Plus Compressed Migration: An Integrated Solution to Parallel Simulations' Data Transport Needs", University of Illinois at Burbana-Champaign.
Lee et al.: "Enhancing Data Migration Performance via Parallel Data Compression", University of Illinois, Urbana, IL.
Anurag Acharya et al., "Tuning the Peformance of I/O-Intensive Parallel Applications", University of Maryland and Center for Excellence in Space Data and Information Sciences, 13 pages.
Gagan Agrawal etl al., "An Interprocedural Framework for Placement of Asynchronous I/O Operations", UMIACS and Department of Computer Science, University of Maryland, 25 pages.
Alberto Apostolico et al., "Compression of Biological Sequences by Greedy Off-Line Textual Substitution", Purdue University and Universita di Padova, 10 pages.

(Continued)

*Primary Examiner* — Shyue Jiunn Hwa
(74) *Attorney, Agent, or Firm* — Vista IP Law Group, LLP

(57) ABSTRACT

An improved approach is described for implementing transformations of data records in high concurrency environments. Each transformation is performed in parallel at the source when the data record is first generated. According to one approach for data integrity validation, record generators compute an integrity checksum for a newly generated record before copying into a data unit in shared memory. Subsequent generators may aggregate integrity checksums for data records into checksums for data units incrementally. This approach achieves end-to-end protection of data records against corruption using an efficient method of maintaining verifiable data integrity. In another approach, compression and encryption data transformations may be performed by themselves, or in combination with an integrity checksum transformation.

42 Claims, 33 Drawing Sheets

(56) References Cited

OTHER PUBLICATIONS

Joseph Bester et al., "GASS: A Data Movement and Access Service for Wide Area Computing Systems", Argonne National Laboratory, The University of Chicago and University of Southern California, 11 pages.

Zhiyuan Chen et al., "An Algebraic Compression Framework for Query Results", America 77, Cornell University, 20 pages.

Zhiyan Chen et al., "Query Optimization in Compressed Database Systems", Cornell University and AT&T Labs-Research, 12 pages.

Juan Miguel Del Rosario et al., "Improved Parallel I/O via a Two-phase Run-time Access Strategy", Syracuse University, Feb. 9, 1993, 15 pages.

Phillip M. Dickens et al., "Improving Collective I/O Performance Using Threads", Illinois Institute of Technology and Argonne National Laboratory, 14 pages.

Vadim Engelson et al., "Lossless Compression of High-volume Numerical Data from Simulations", Linkoping University, Sweden, 13 pages.

Robert A. Fiedler, "Optimization and Scaling of Shared-Memory and Message-Passing Implementations of the Zeus Hydrodynamics Algorithm", Hewlett Packard Co., U.S. Naval Research Laboratory, Wasington, DC, 16 pages.

Ian Foster et al., "Globus: A Metacomputing Infrastructure Toolkit", Argonne National Laboratory, The Beckman Institute, California Institute of Technology, 16 pages.

Ian Foster et al., "Remote I/O: Fast Access to Distant Storage", Argonne National Laboratory, Argonne, IL, 14 pages.

James Arthur Kohl G.A. Geist, II et al., Cumulvs: Providing Fault-Tolerance, Visualization and Steering of Parallel Applications, Mathematical Sciences Section, Oak Ridge National Laboratory, Oak Ridge, Tennessee, 11 pages.

Paul G. Howard et al., "Parallel Lossless Image Compression Using Huffman and Arithmetic Coding", Brown University and Duke University, 11 pages.

David Kotz, "Disk-directed I/O for MIMD Multiprocessors" Dartmouth College, Hanover, New Hampshire, 14 pages.

David Kotz et al., "Caching and Writeback Policies in Parallel File Systems", Dartmouth College, Hanover, New Hampshire, an Duke University, Durham, North Carolina, 8 pages.

Jonghyn Lee et al., "Tuning High-Performance Scientific Codes: The Use of Performance Models to Control Resource Usage During Data Migration and I/O", University of Illinois, 18 pages.

Xiaosong MA et al., "Faster Collective Output through Active Buffering", University of Illinois at Urbana-Champaign, 8 pages.

Jeffrey C. Mogul et al., "Potential benefits of delta encoding and data compression for HTTP", Digital Equipment Corporation Western Research Laboratory, Palo Alto, California, and AT&T Labs-Research, Florham Park, New Jersey, 1997 ACM, 14 pages.

Henrik Frystyk Nielsen et al., "Network Performance Effects of HTTP/1.1, CSSI, and PNG", World Wide Web Consortium and World Wide Web Consortium Digital Equipment Corporation, 12 pages.

Nils Nieuwejaar et al., "The Galley Parallel File System", Dartmouth College, Hanover, New Hampshire, Elsevier Preprint, Aug. 28, 1996, 35 pages.

Jaechun NO et al., "Design and Implementation of a Parallel I/O Runtime System for Irregular Applications", Syracuse University, Nov. 3, 1997, 37 pages.

Apratim Purakayastha et al., "ENWRICH: A Compute-Processor Write Caching Scheme for Parallel File Systems", Duke University, Oct. 19, 1995, 27 pages.

Randy L. Ribler et al., "Autopilot: Adaptive Control of Distributed Applications", University of Illinois, Urbana, Illinois, 8 pages.

Eric Rivals et al., "A Guranteed Compression Scheme for Repetitive DNA Sequences" Laboratoire d'Informatique Fondamentale de Lille, IT-95-285, Nov. 21, 1995, 11 pages.

M. Winslett, S. Kuo et al., "Applications Experience with Parallel Input/Output: Panda and the H3expresso Black Hole Simulation on the SP2", University of Illinois, Urbana, Illinois, 25 pages.

Y. Chen K.E. Seamons et al., "Server-Directed Collective I/O in Panda", University of Illinois, Urbana, Illinois, 14 pages.

Rajeev Thakur et al., "Data Sieving and Collective I/O in ROMIO" Argonne National Laboratory, Argonne, Illinois, Aug. 1998, 18 pages.

Jon B. Weissman, "Smart File Objects: A Remote File Acces Paradigm" Univerisity of Texas at San Antonio, San Antonio, Texas, 12 pages.

\* cited by examiner

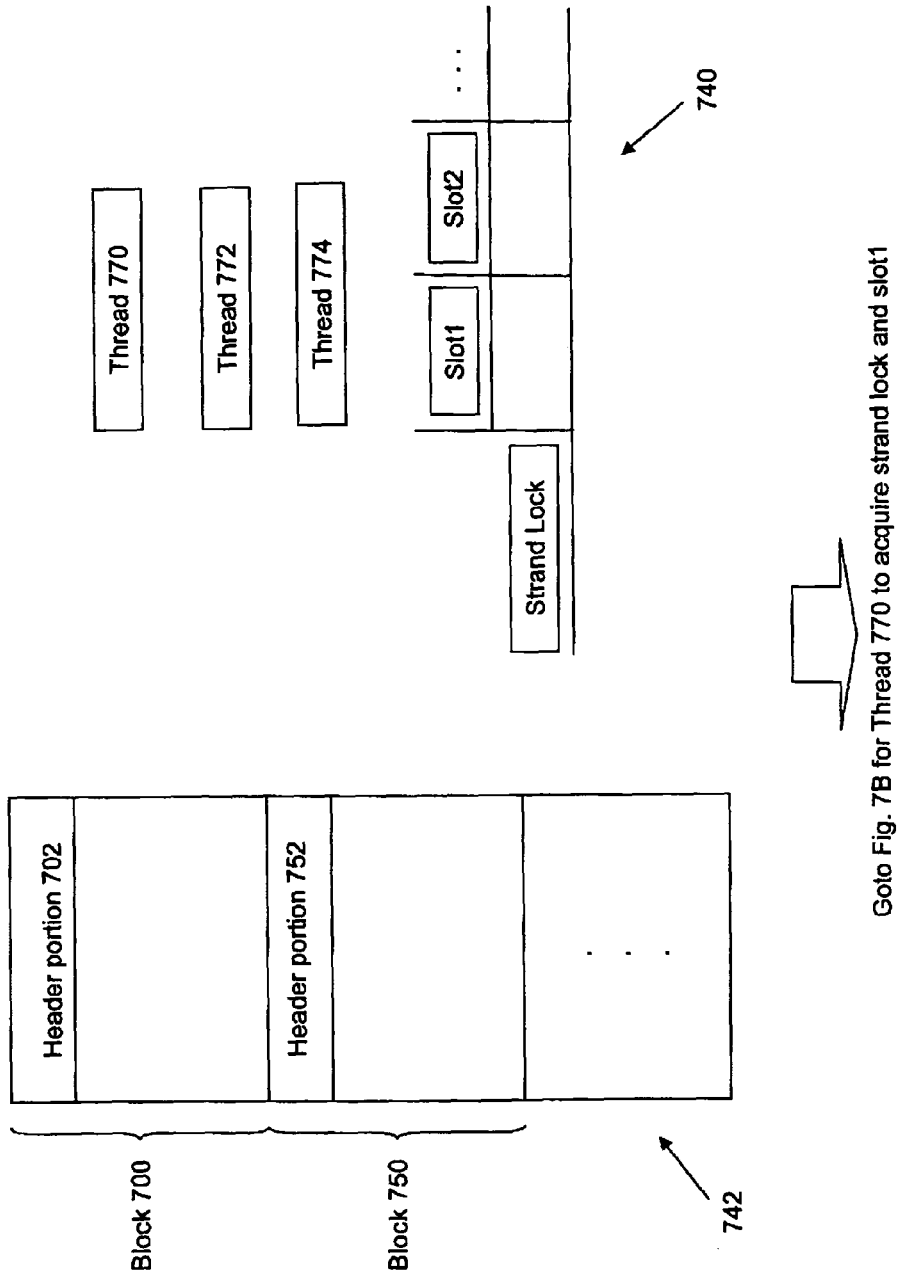

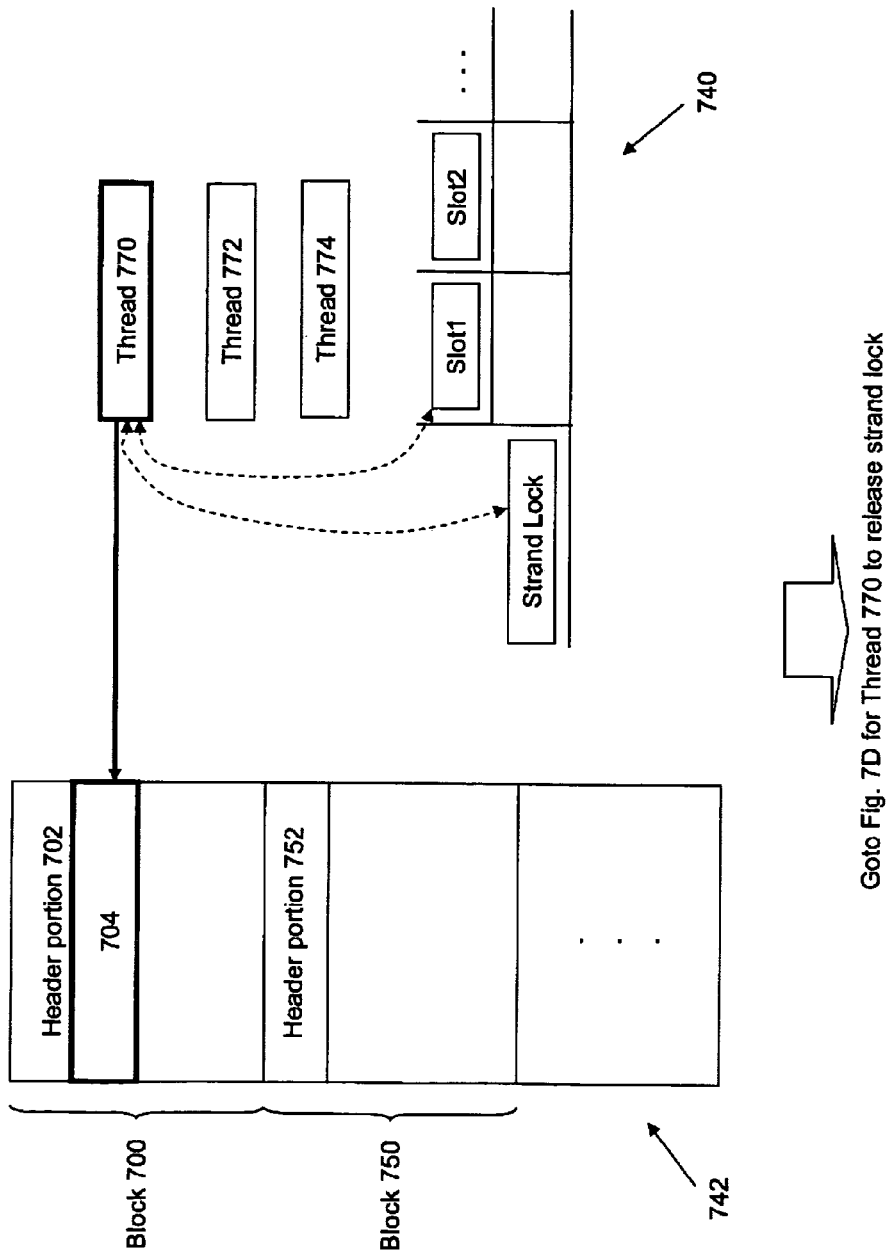

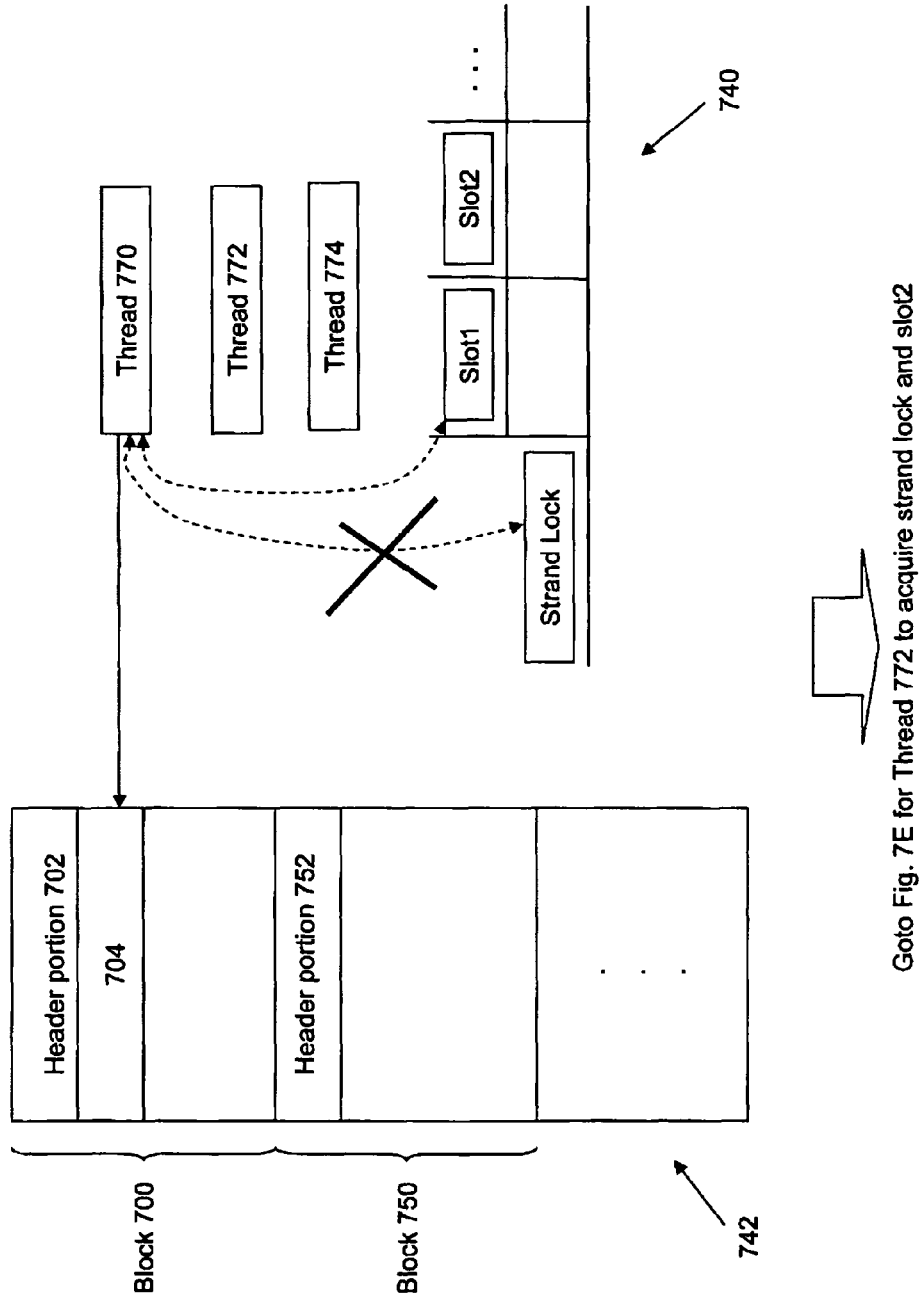

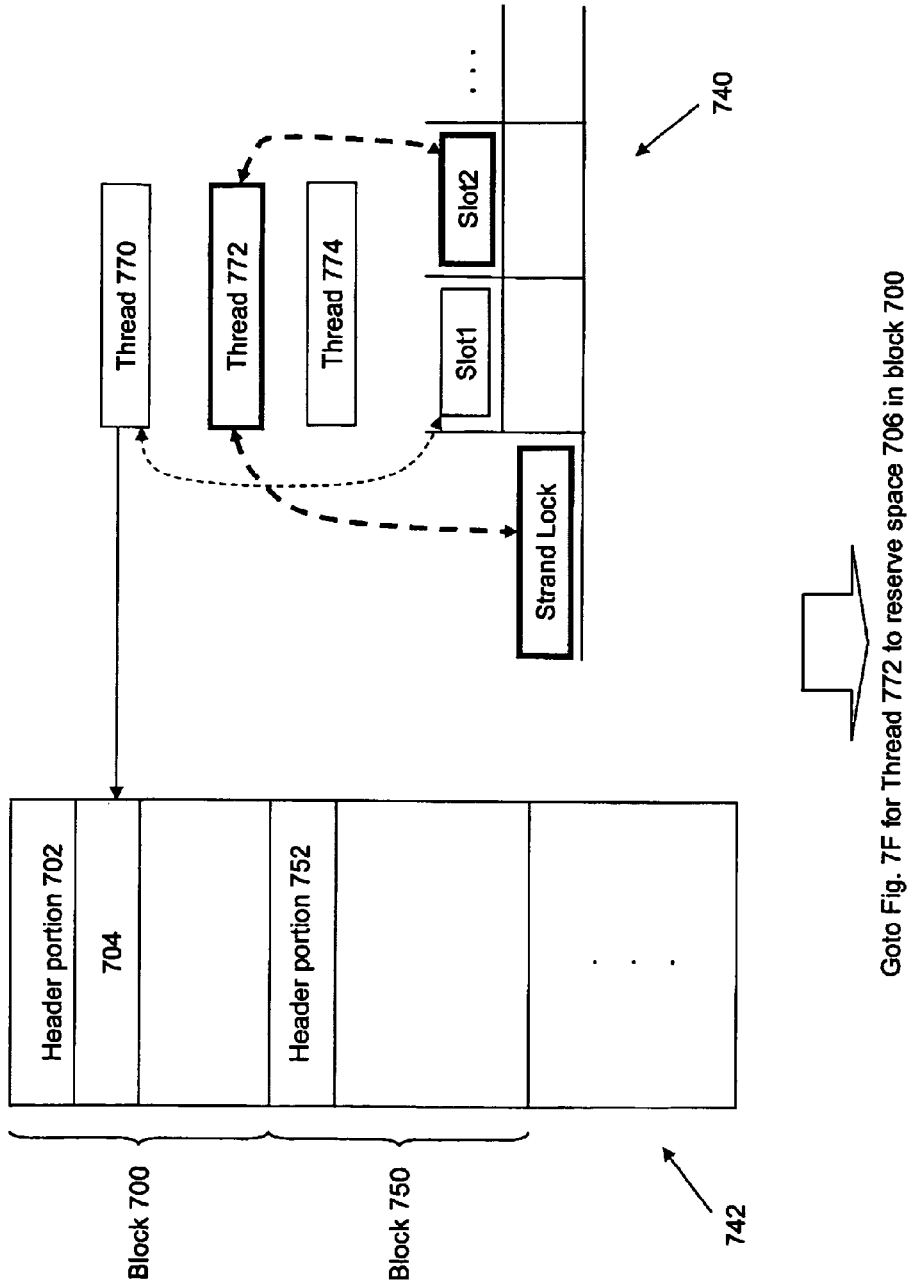

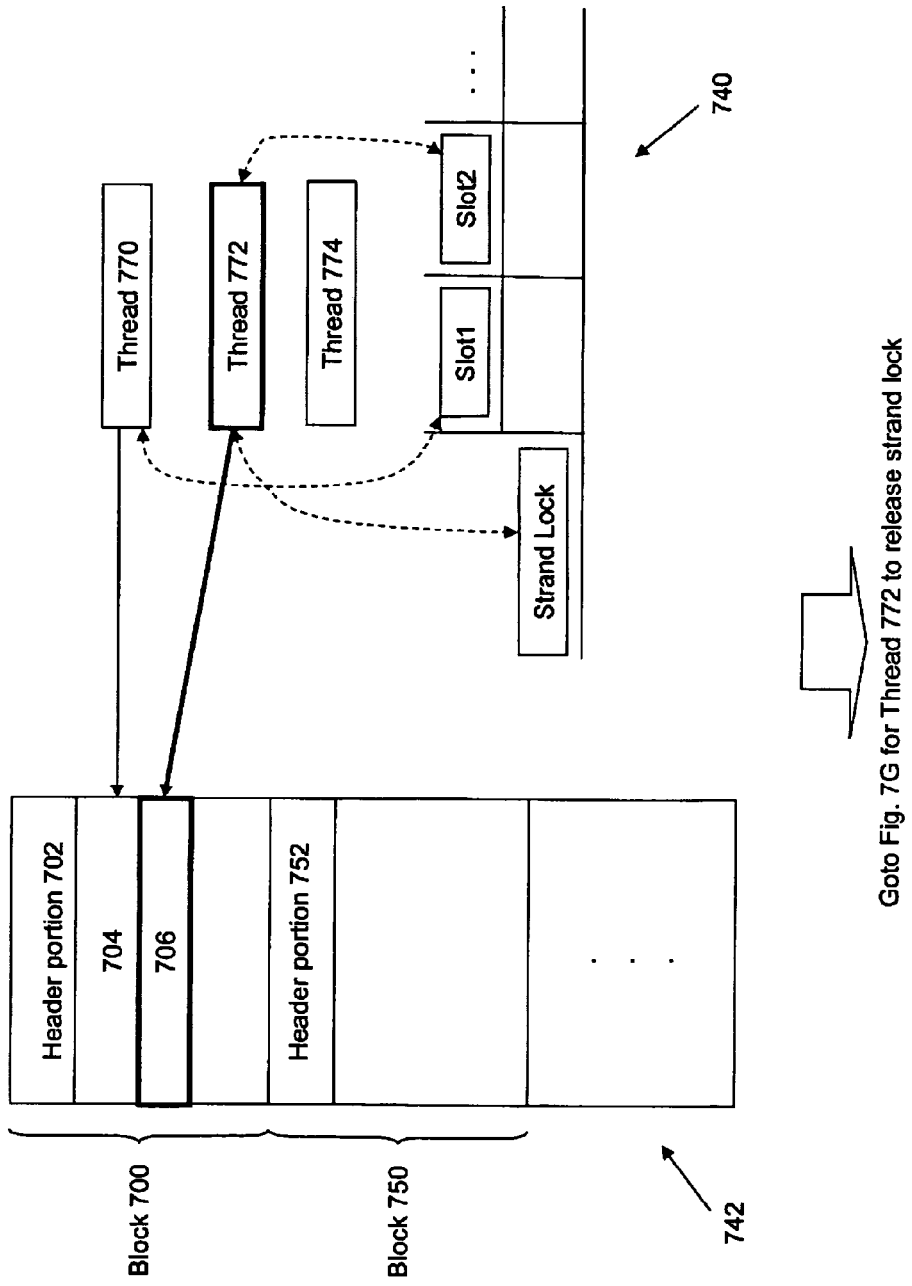

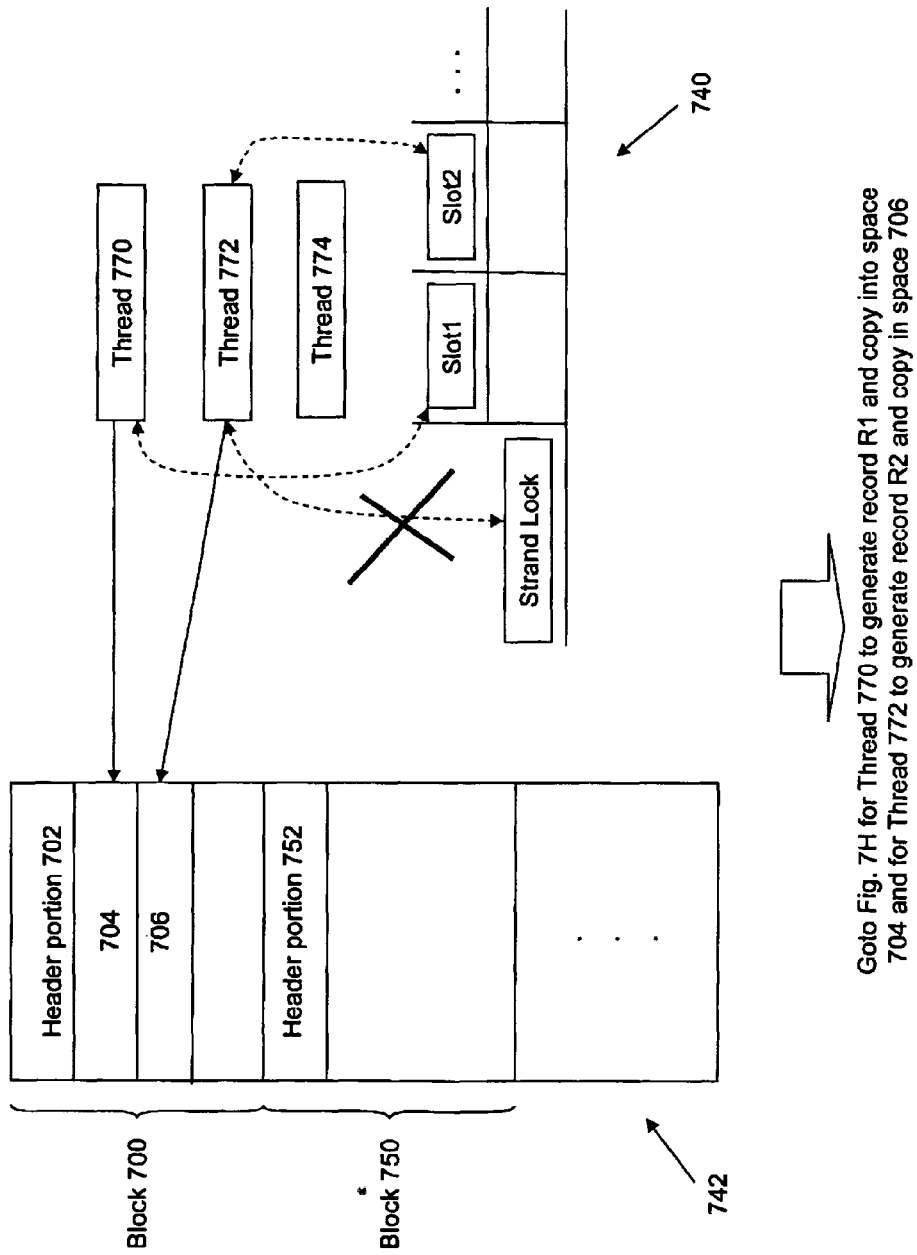

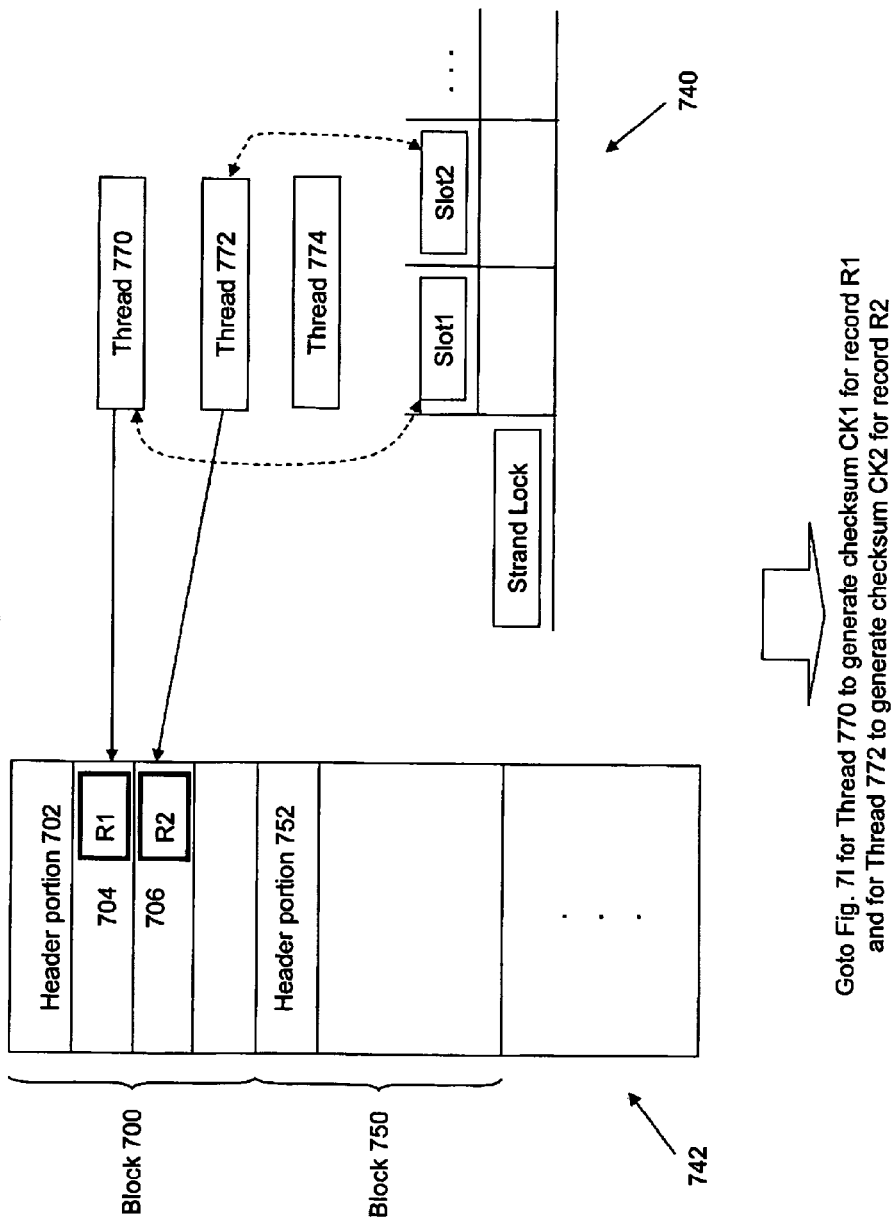

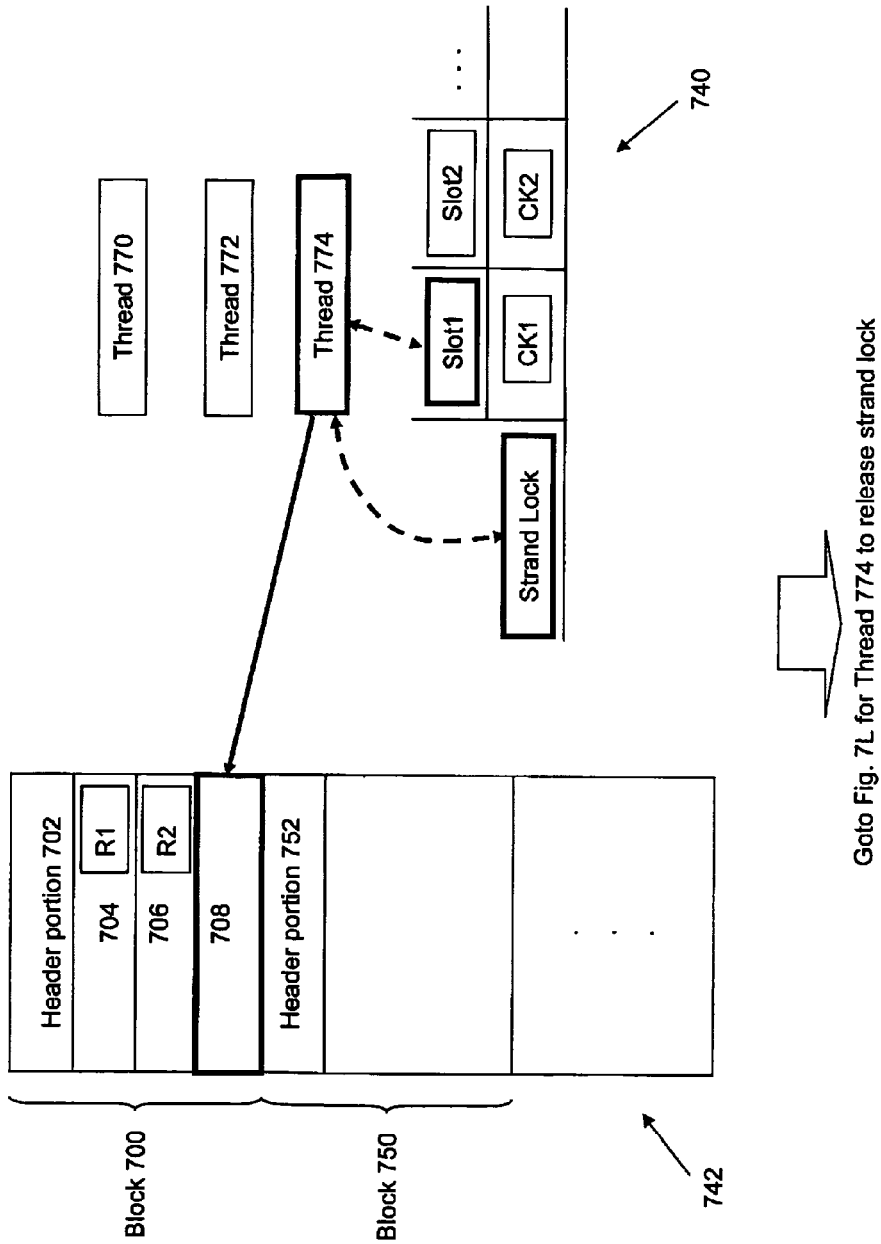

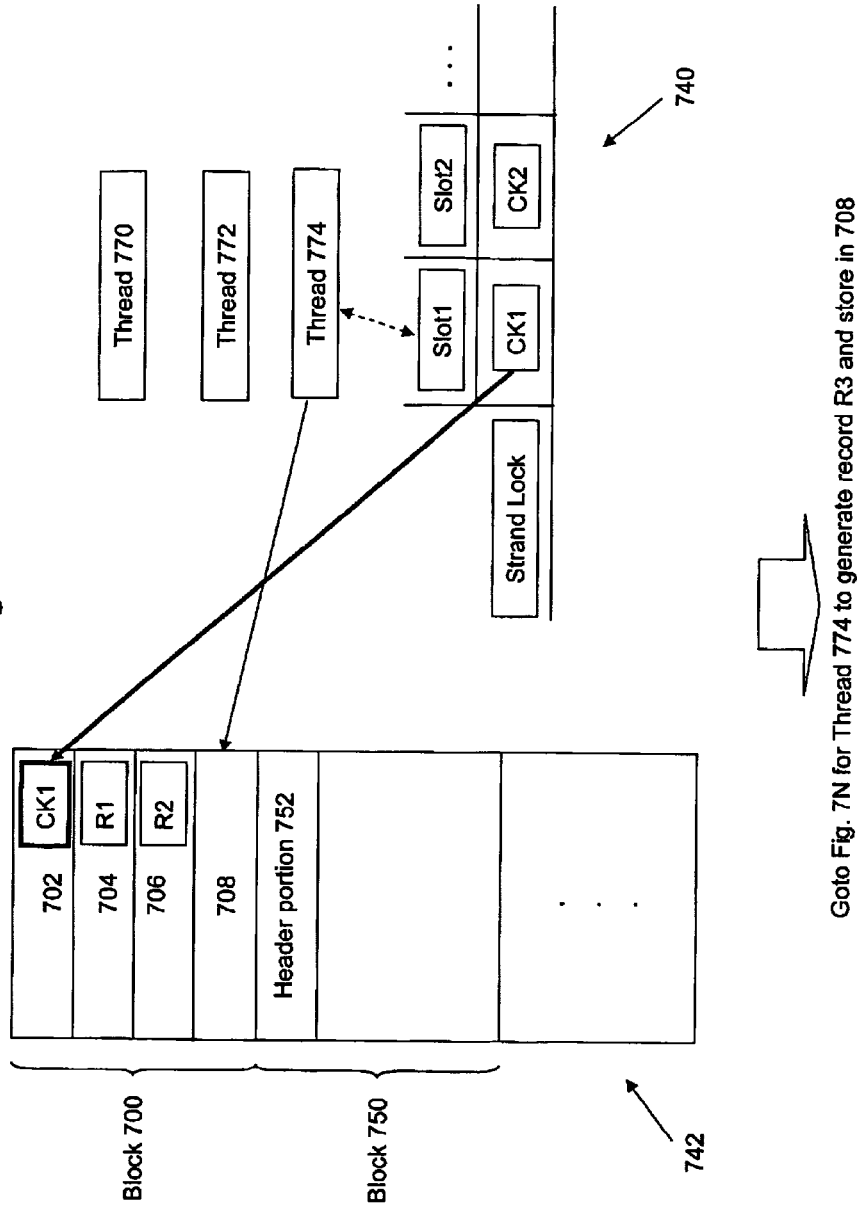

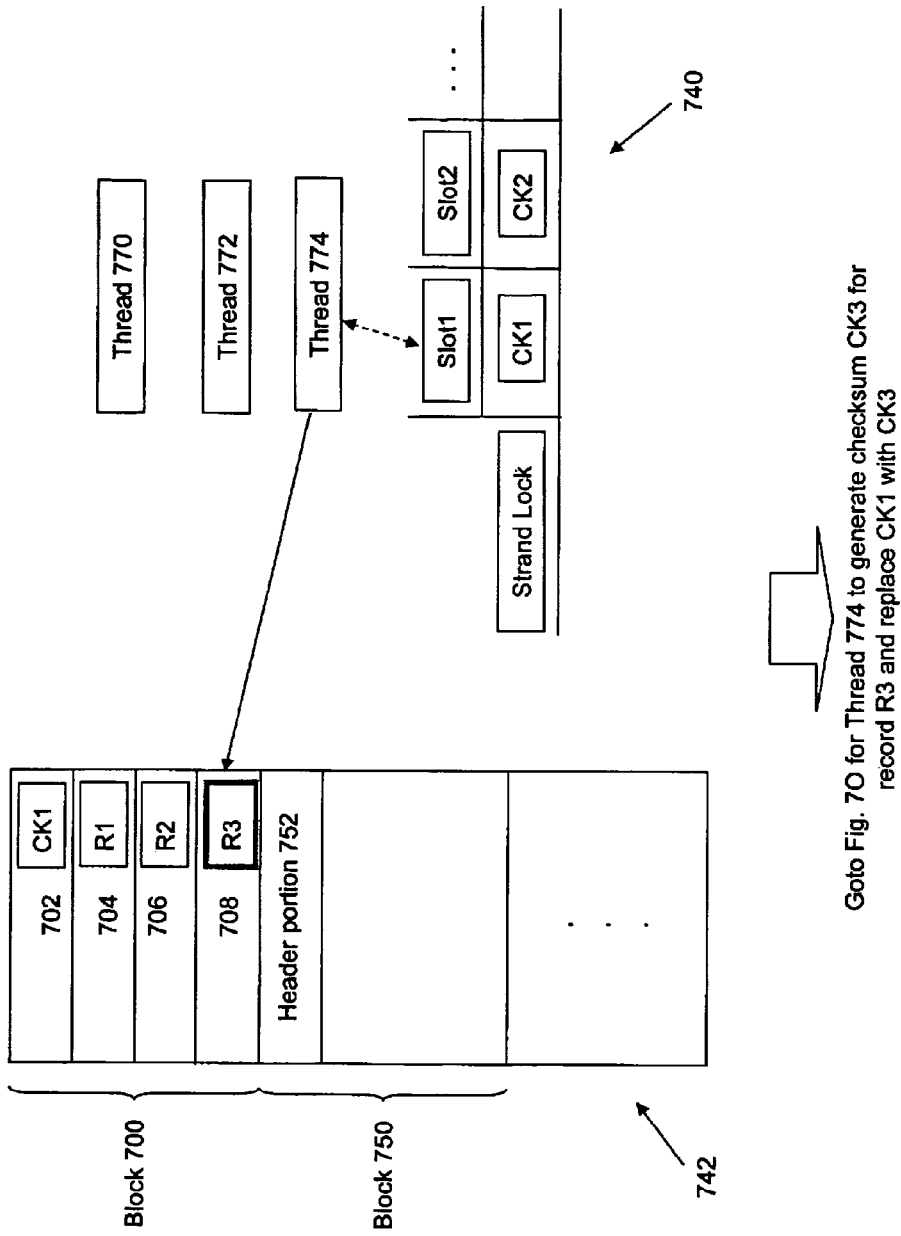

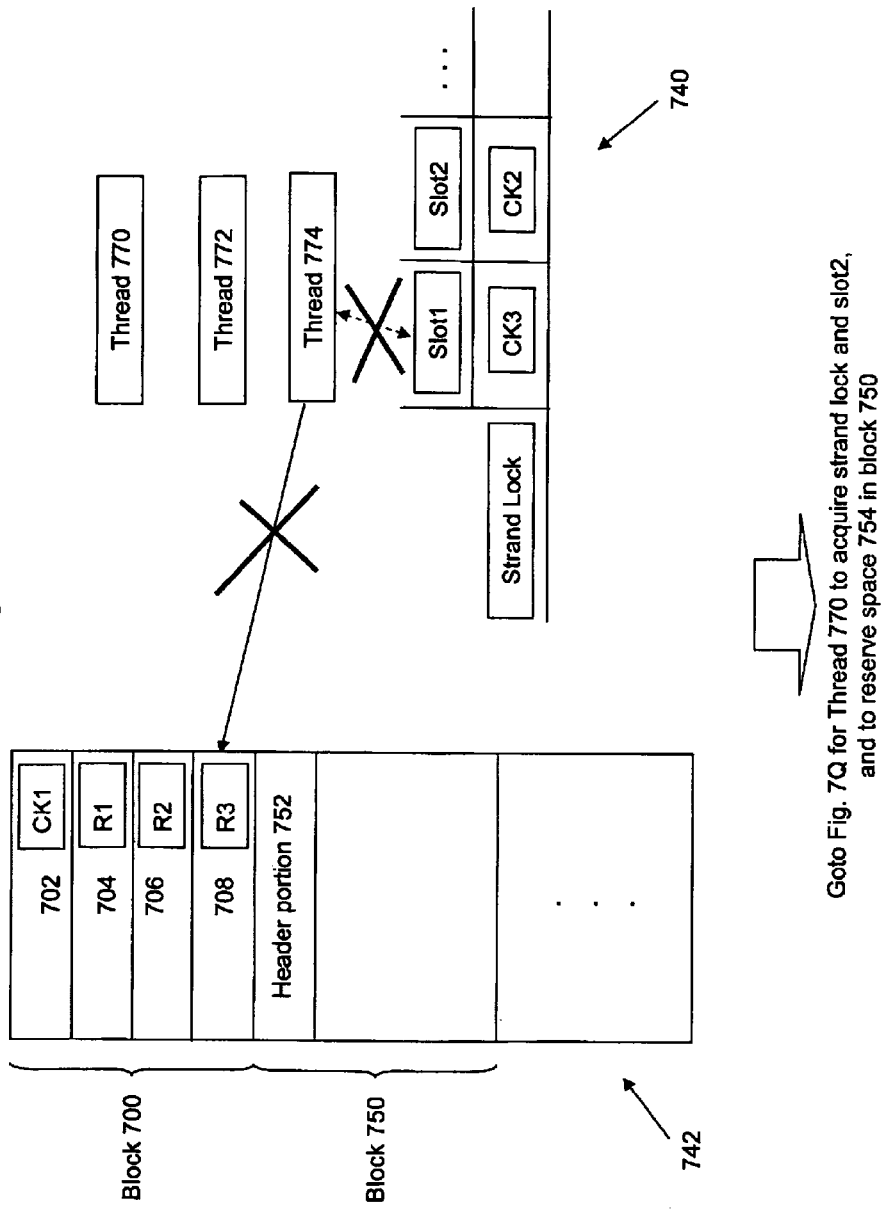

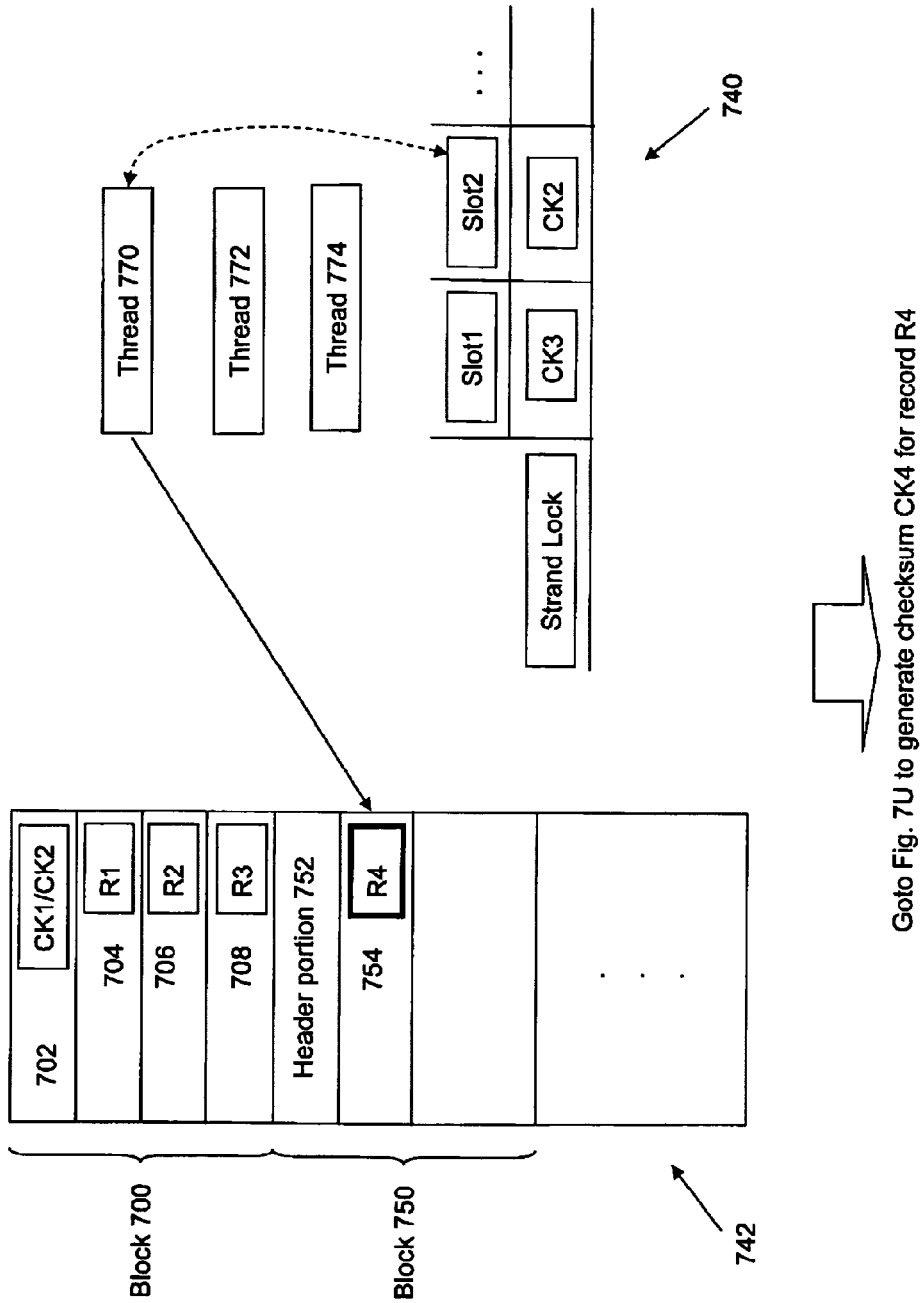

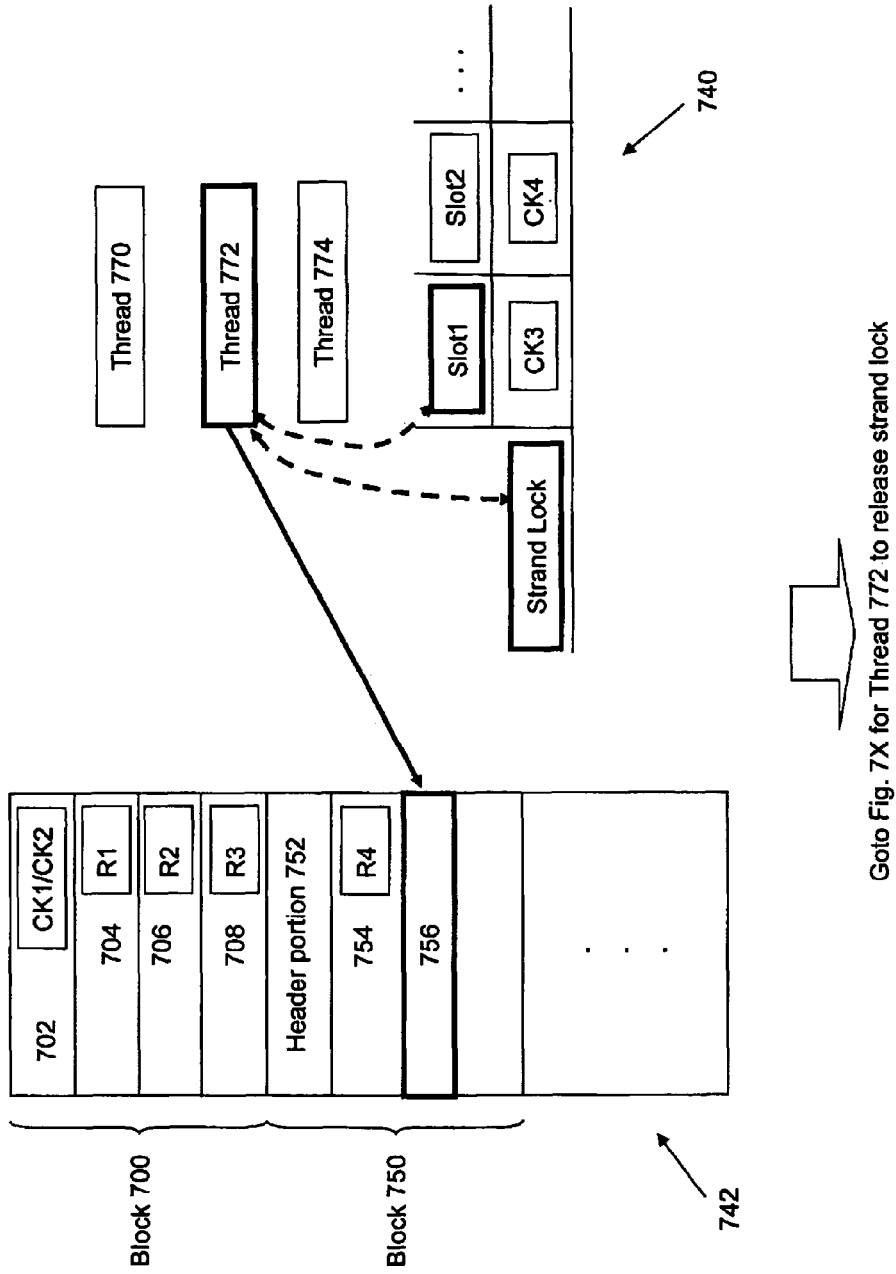

METHOD AND SYSTEM FOR IMPLEMENTING PARALLEL TRANSFORMATIONS OF RECORDS

BACKGROUND AND SUMMARY

The invention is directed to an approach for implementing parallel transformations of data records.

A "transformation" of data refers to the process of converting or manipulating data from one form or state to another. There are many types of transformations that may occur to data in computing systems.

For example, a common type of transformation is to calculate a "checksum" for a given set of data. A checksum is based upon any sort of algorithm that transforms a set of data into a value that can be used to verify the integrity of the data that it describes. In general, the checksum is based upon a numerical determination or a type of "summing" of a set or sequence of the bits that make up the data. If that data later becomes corrupt in some way, e.g., some of the bits are "flipped," then the checksum of the corrupt data will not match the checksum of the original data.

Compression is another example of a commonly used transformation. Compression refers the process of encoding information in a manner that reduces the bandwidth or storage requirements of that data.

Yet another example of a common transformation is an encryption algorithm. Encryption refers to the process of converting one form of data into a non-open or cipher-based form of data. The ordinary goal of the encryption-type transformation is to prevent any but intended recipients of the encrypted data from being able to legibly understand or access the data.

While very useful, there could be efficiency concerns with specific implementations of transformation algorithms. For example, consider the application of a transformation to a set of ordered records that are to be written to the same data unit. In this circumstance, the approach of sequentially performing the transformation upon the ordered records could result in severe performance bottlenecks.

To address this and other problems, the present invention provides an improved approach for implementing transformations of data records. According to some embodiments, parallelization of transformations is performed against the data records. For checksums, record generators compute the checksum for a newly generated record before copying into shared memory. Subsequent generators may aggregate integrity checksums for data records into checksums for data units incrementally. For incompletely-aggregated data units, final aggregations may be performed before the data units are written to persistent storage. The checksum is stored at a well-known location with respect to the data unit—the checksum could be stored either outside to the data unit or inside the data unit, e.g., in a block header.

Other and additional objects, features, and advantages of the invention are described in the detailed description, figures, and claims.

DETAILED DESCRIPTION

Figure 1:
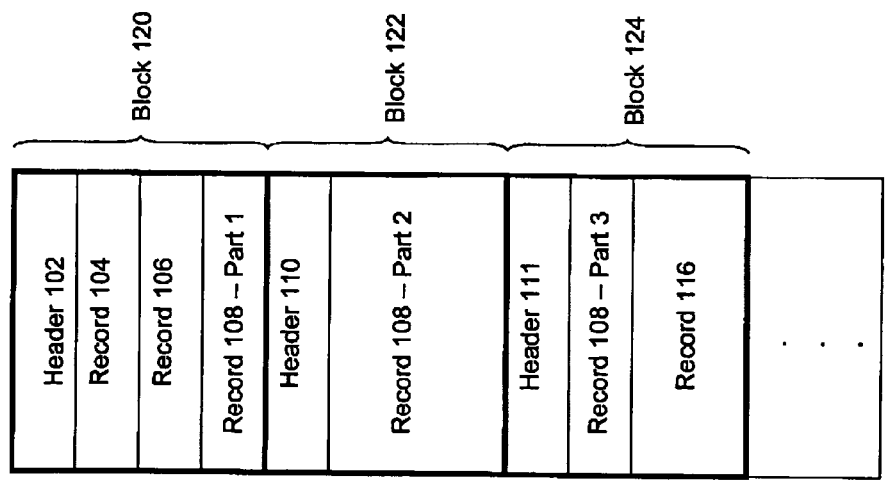
FIG. 1 illustrates an example set of ordered records.

Embodiments of the present invention provide an improved approach for implementing transformations of data records. According to some embodiments, parallelization of transformations is performed against the data records. For checksums, a record generator entity computes the checksum for a newly generated record before copying the checksum value to its intended location. Subsequent generator entities may aggregate the checksums of the same data unit, e.g., sharing the same block, incrementally.

For the purposes of illustration, embodiments of the present invention will be specifically described by example with respect to the checksum transformation. It is noted, however, that the invention may be applied to other types of transformations, such as compression and encryption transformations.

In addition, the invention will be illustratively described in the context of performing checksums on ordered records in the form of "redo logs" for database systems. However, the invention is not limited in its scope to just database records. Any type of data record suitable for transformations may be used in conjunction with the invention. Other examples of ordered data records include: file system journal logs, change tracking data, audit records for banking (e.g., fiends transfer) applications.

Since the illustrative examples in this document are described relative to database records, a brief description will now be provided of ordered records in database systems. In database systems, a "transaction" normally refers to an atomic set of operations performed against a database. The transaction may access, create, modify, or delete database data or database metadata while it is being processed. A "commit" occurs when the transaction has completed its processing and any changes to the database by the transaction are ready to be "permanently" implemented in the database system. Because the transaction is atomic, all actions taken by the transaction must appear to be committed at the same time.

Ordered records, such as transaction log records, can be maintained in a database systems, e.g., to allow suitable recovery operations in the event of a system failure or aborted transaction. Some common problems that could cause a system failure or an aborted transaction include hardware failure, network failure, process failure, database instance failure, data access conflicts, user errors, and statement failures in the database access programs (most often written in the structured query language or SQL).

Different types of transaction log records can be maintained in a database system. A common transaction logging strategy is to maintain log records for the transaction, such as "redo" records that log all changes made to the database. Each redo record contains information that can be used to modify a portion of a database, e.g., a database block, from one state to its next changed state. If a failure occurs, then the redo records may be applied in order to restore any changes made to the in-memory copy of the database. In one approach for implementing redo, as each change is made to the database system, a redo record corresponding to the change is written to an in-memory redo buffer. The contents of the in-memory redo buffer are regularly flushed to an on-disk redo log to persistently store the redo records. All redo records for the system are stored in this in-memory redo buffer.

U.S. Pat. No. 7,039,773, which is hereby incorporated by reference, describes one approach for implementing ordered and partially-ordered records, such as redo records, in a database system. According to one embodiment described in this patent, multiple parallel sets of records may be created and combined into a partially ordered or non-ordered group of records, which are later collectively ordered or sorted as needed to create an ordered set of records. With respect to database systems, redo generation bottleneck can be minimized by providing multiple in-memory redo buffers that are available to hold redo records generated by multiple threads of execution.

FIG. 1 shows an example of a storage structure 150 that can be used to store ordered records in a database system. Storage structure 150 is composed of a set of data storage units. In this described example, each data storage unit corresponds to a "block," although it is noted that the invention is applicable to other types of data units as well. The size and composition of the data unit may be determined by the specific configuration of the system or software in which the invention is applied. For example, in some systems, the size for a redo record may be configured based upon atomicity concerns or system I/O parameters.

The example of FIG. 1 shows three blocks—block 120, 122, and 124. The blocks 120, 122, and 124 each correspond to a selected size, e.g., 512 bytes, although as noted above, the size of the block is not limiting to the invention but is instead based upon the specific system or software to which the invention is applied. Each block 120, 122, and 124 includes a header portion 102, 110, and 111, respectively, which includes metadata information about that block. For example, the block checksum and/or the block identification number can be stored in the block header.

Each block also contains allocated space to store the ordered log records inside that block. Here, block 120 includes space to store log records 104 and 106, as well as the first part of record 108. Block 122 includes space to store the second part of record 108. Block 124 includes space to store the third and final part of record 108 as well as record 116. As is evident, according to some embodiments, a record could span multiple blocks. While each block is shown to include a certain number of allocated spaces to store records, it is noted that the storage space within the blocks can be suitably configured to include any number of individual storage spaces, and the storage spaces could be of different sizes.

As described in U.S. Pat. No. 7,039,773, multiple processing entities can be used to generate the log records within a block. This type of approach improves scalability and processing efficiency since numerous threads of execution can concurrently be used to generate and store the log records into the block. As used herein, the term processing entity refers to any type of computing entity that can be used to perform work in a computing system. Examples of such processing entities include processes, threads, tasks, processors, and nodes. The terms "thread" or "process" will be used in this document to generically refer to such processing entities.

A checksum can be maintained for each block 120, 122, and 124 to implement integrity checks for the block. The checksum provides a single value for the block which can be used to determine whether the block, or any portion of it, has experienced any corruption. According to some embodiments, the checksum value for the block is maintained in the block header.

Figure 2:
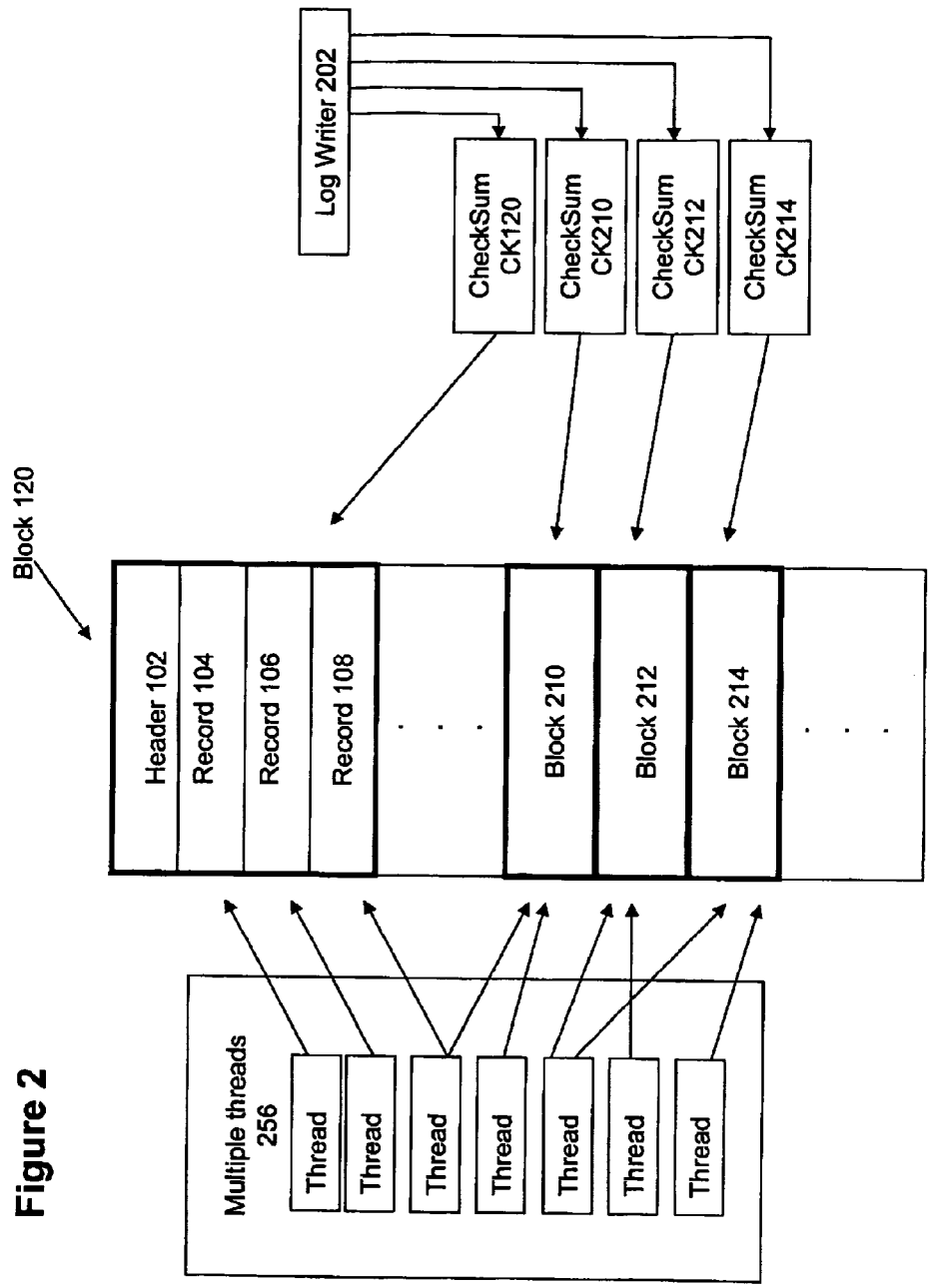
FIG. 2 shows a single log writer process being used to generate checksums upon a set of ordered records.

FIG. 2 shows one possible approach for generating checksums using a log writer process 202. In this approach, the ordered records within the blocks 120, 210, 212, and 214 are concurrently generated by multiple threads of execution 256. However, a single log writer entity 202 is used to generate the checksums CK120, CK210, CK212, and CK214 for the blocks 120, 210, 212, and 214, respectively. The obvious problem with this approach is that the checksum calculation for each data unit of ordered records is not parallelized, even though the process to generate the ordered records is parallelized. As a result, the checksum computation can become a scalability bottleneck.

A simplistic solution to this problem is to merely have multiple dedicated processes/threads compute the checksums of distinct data units in parallel. However, the problem with this simplistic solution is that a checksum process/thread (e.g., a checksum calculator) may be stalled waiting for some data generator to complete its processing before the calculator can perform a block checksum. In addition, the burden of coordinating multiple checksum calculators will also require a significant amount of overhead.

Another problem with the single log writer approach is that it may not detect stray memory writes, memory bit flips, and other corruptions induced by software and hardware bugs, during the period between the original record generation and the eventual write to persistent storage.

Figure 3:
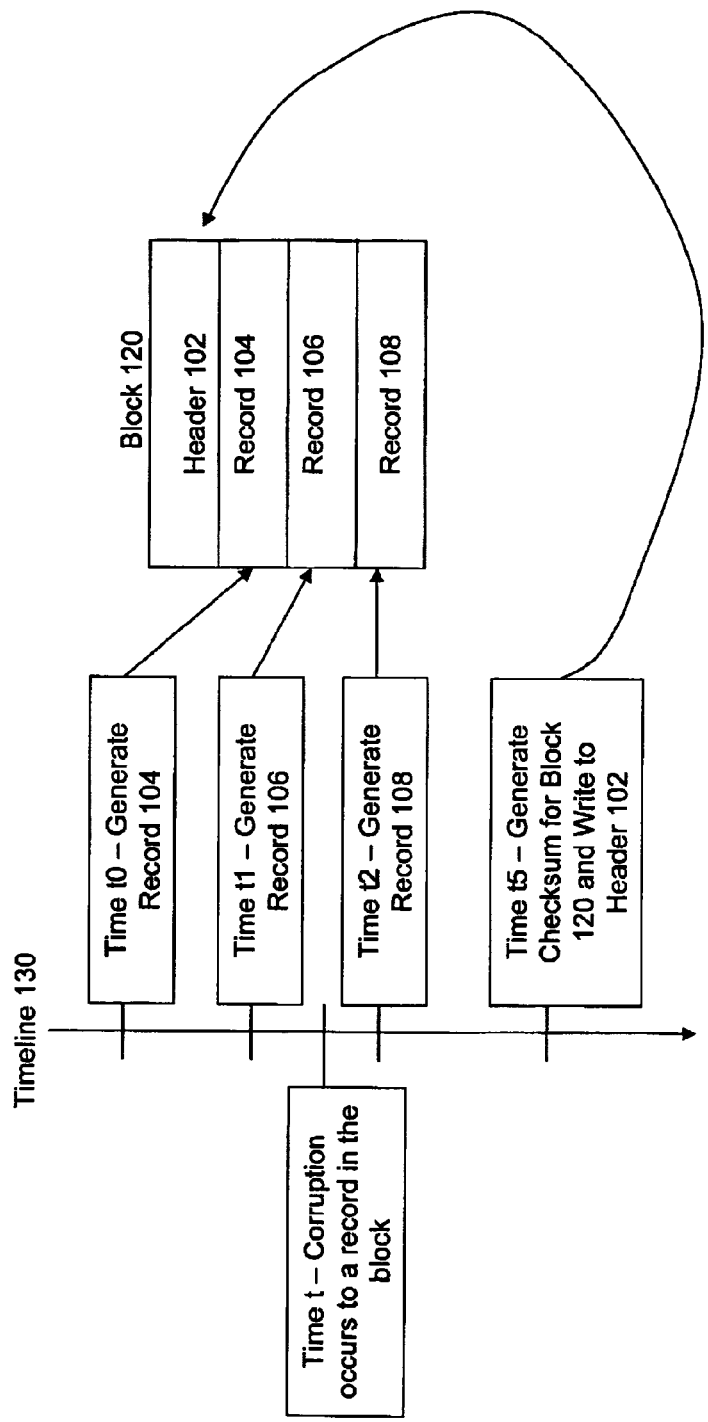
FIG. 3 shows a possible corruption problem that may occur to a set of ordered records.

This problem is illustrated in FIG. 3. A timeline 130 is shown with an example sequence of actions that occur to write the data in block 120. At time t0, the first record 104 in block 120 is generated and stored into the block 120. At time t1, the second record 106 is generated and stored for block 120. At time t2, the third record 108 for block 120 is generated and stored into the block 120. Thereafter, at time t5, a checksum is calculated for the entire block and stored in the header 102 for block 120. At any later point in time, the checksum can be checked to determine if subsequent corruption has occurred to block 120.

The issue is that prior to the time that the checksum is generated at t5, a corruption may have occurred in an intervening time t to one of the records 104, 106, and 108 in block 120. The longer the period between the first write at time t0 and the checksum generation at time t5, the greater the chance that such a corruption could occur. If the checksum is calculated by the single log writer at a time t5 before the block write, then the checksum will only see the version of the block after corruption has already occurred.

Yet another problem is that when a single process/thread is used to checksum a large number of ordered records, it could pollute the local processor's cache and force other processes/threads on the same processor to work off wiped or polluted cache lines. While this problem can be addressed by binding the checksum calculator to a dedicated processor, this approach requires manual configuration and may incur waste of processing power if the calculator cannot fully saturate the dedicated processor.

Figure 4:
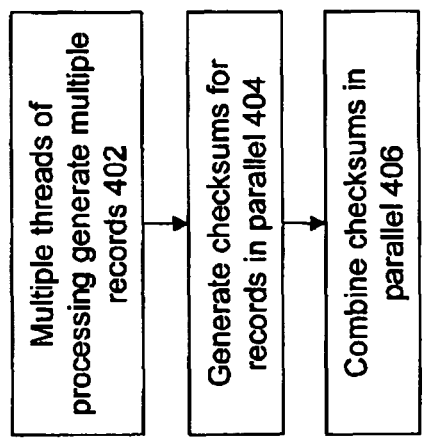
FIG. 4 shows a flowchart of a process for generating checksums according to some embodiments of the invention.

FIG. 4 shows a high-level flowchart of a process to implement checksums for ordered records that address these problems. At 402, multiple threads of processing are used to concurrently generate multiple ordered records.

At 404, checksums are generated in parallel for the ordered records. Each thread or process that is generating a record will compute a checksum for that newly generated record. Thereafter, at 406, subsequent record generators will aggregate the checksums for the records within the same data unit. For incompletely-aggregated data units, final aggregations may be implemented before the data units are written to an intended storage location, e.g., persistent storage. The checksum could be stored at a fixed location inside the respective data unit, or externally stored. This solution maintains the maximum concurrency for ordered record generation, e.g., as proposed in U.S. Pat. No. 7,039,773.

Figure 5:
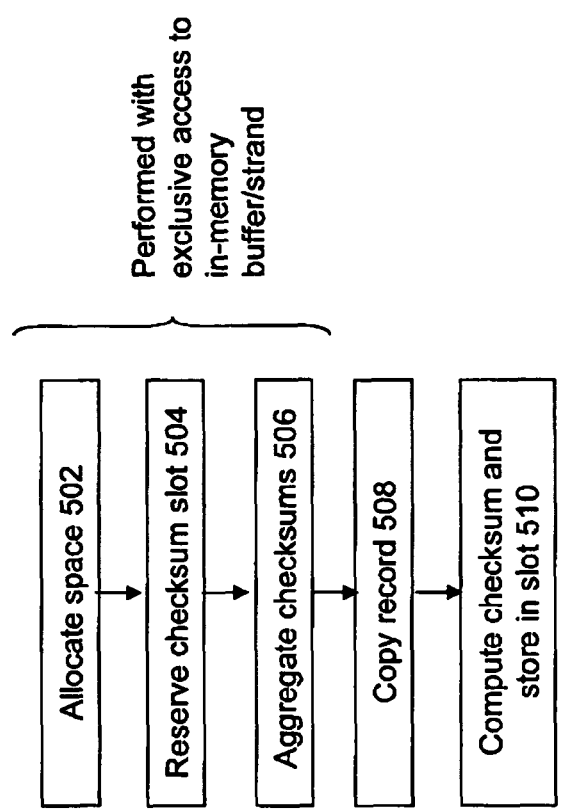
FIG. 5 shows a flowchart of a sequence of actions taken by a process for generating records and computing checksums according to some embodiments of the invention.

FIG. 5 shows a flowchart of the actions taken by the threads or processes that are generating the log records. The record generators copy records into in-memory buffers called "strands." Each strand consists of one or more data units, such as data blocks. According to some embodiments, the approach shown in FIG. 5 uses a locking mechanism to ensure that multiple record generators do not attempt to write to the same space within a block. Each strand is associated with a "strand lock" and while holding the lock, each record generator is guaranteed to have an exclusive access to the associated strand and thus can allocate its own space in contiguous block(s) to copy the record. The record generators save the record checksums into an auxiliary checksum array before they are aggregated into the block checksum in the header.

At 502 of FIG. 5, the record generator reserves enough space within a strand to write the log record. Then, the record generator reserves a checksum slot in the checksum array (504) and aggregates the existing checksum in the slot if any, into the corresponding block header (506). It is noted that in a present approach, a slot in the checksum array can be reserved only after a previous record generator using the same slot has finished the record generation and the checksum computation for that record. According to some embodiments, 502, 504, and 506 assume the record generator maintains an exclusive access to the strand by holding the strand lock.

The record generator then copies the data for the record into the space that has been reserved within the block(s) (508).

At this point, the checksum for the log record is immediately calculated (510). By immediately calculating the checksum individually for the new log record, this approach avoids the problem of allowing too much time to elapse between the generation of the record and the generation of the checksum. If a block in its entirety is occupied by the record, the record generator directly updates the checksum for the block in the block header. Otherwise, the record generator stores the "partial" checksum(s) for the rest of the record in the slot reserved earlier at 504.

Figure 6:
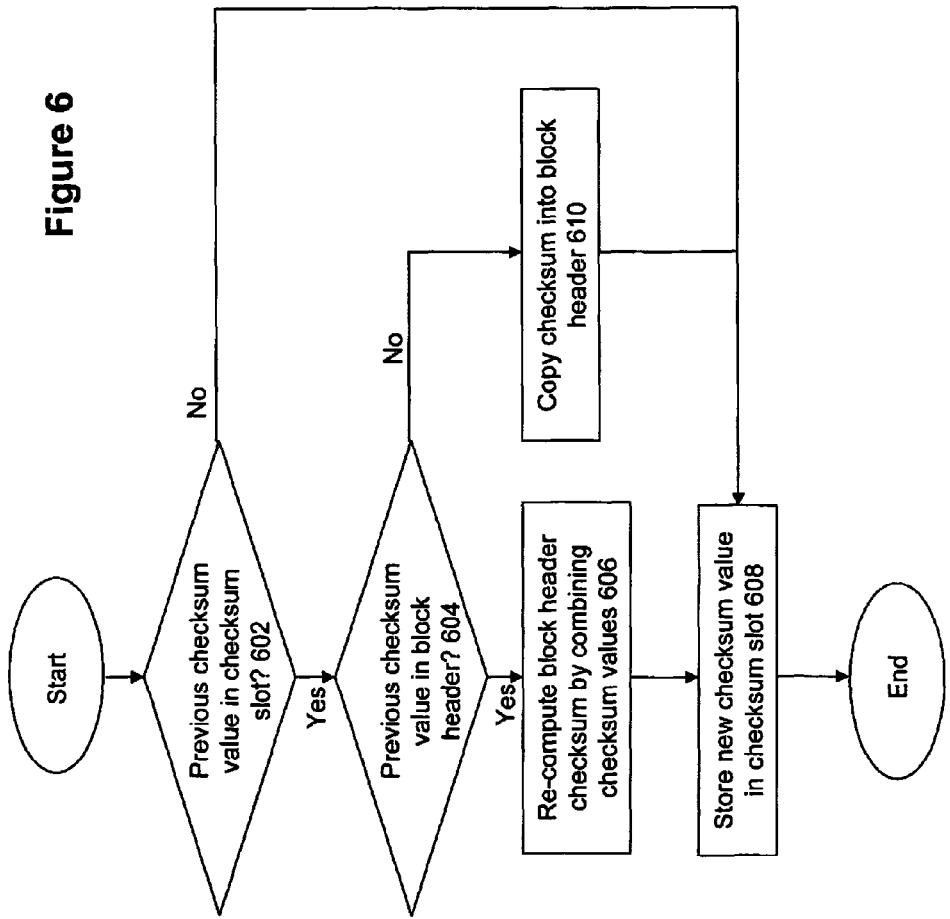
FIG. 6 shows a flowchart of a sequence of actions for integrating checksums for a data unit according to some embodiments of the invention.

FIG. 6 shows a flowchart of a sequence of actions for aggregating checksums for a block. When a record generator has completed the generation of the checksum for the log.

However, it is possible that the reserved checksum slot may contain checksums generated by a previous record generator. Therefore, before storing the checksums computed by the current record generator, the existing checksums in the slot need to be aggregated first. If there is no previous checksum stored (602), then this means that the present thread is the first checksum generator for the checksum slot. Therefore, when the thread generates a new checksum for the newly generated log record, that new checksum value for the log record is stored in the array at 608.

However, if there is a pre-existing checksum stored in the reserved checksum slot, this means that a previous record generator that reserved the same slot had already copied a log record to the strand and has already generated a checksum for that log record. A determination is made at 604 whether there is already a checksum value stored in the block header. If not, this means that the block header checksum does not contain any checksums for the log records copied into the block. Therefore, at 610, the checksum in the checksum slot is copied into the block header as the block's current checksum.

If there is a pre-existing checksum value in the block header, this means that the checksums for one or more previously written log records have already been incorporated into the present state of the block header checksum. At this point, at 606, the checksum in the checksum slot is aggregated with the current block header checksum. This aggregation is done while maintaining an exclusive access to the strand to prevent concurrent updates of the block header checksum. After either 606 or 610, when the thread generates a new checksum for the newly generated log record, that new checksum value for the log record is stored in the array at 608.

According to some embodiments, the same checksum function can be used for both the log record checksum computation and the block header checksum aggregation. It is noted that the checksum function should have the additive and commutative properties.

FIGS. 7 A-Z illustrate an example sequence of actions that may occur when generating log records and checksums using this process. FIG. 7A shows two blocks 700 with a header portion 702 and 750 with a header portion 752 associated with a strand 742. Each block includes a header portion and space that can be reserved to store log records.

This example shows three threads 770, 772, and 774 to perform the work of generating the log records and checksums for blocks 700 and 750.

An array 740 is used to represent a holding area for checksums that are generated during the process of copying the log records in this strand.

Figure 7B:
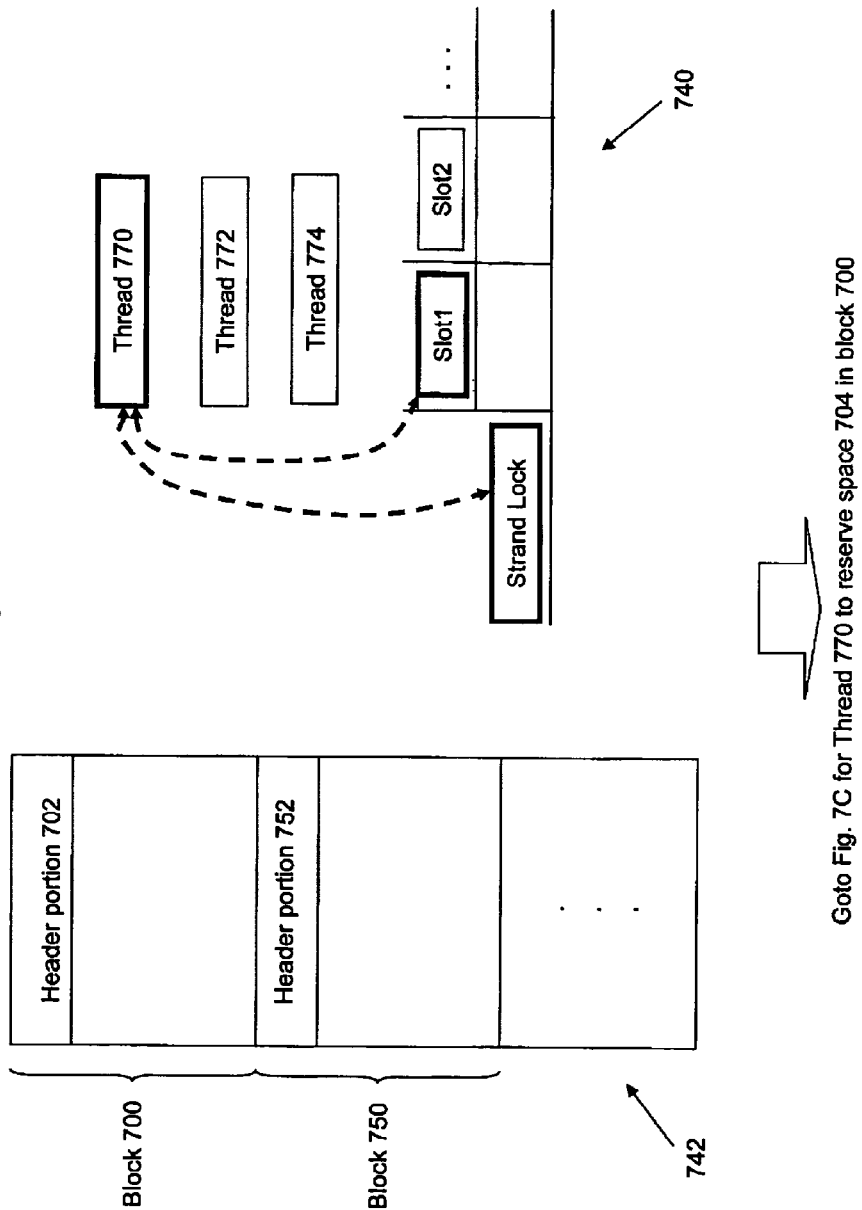
FIGS. 7A-Z illustrate data transformations being performed upon a set of ordered records according to some embodiments of the invention.

FIG. 7B illustrates thread 770 beginning the process of generating a log record. Thread 770 acquires the strand lock so that it can have an exclusive access to the strand and can allocate space within the block(s) in the strand to copy a log record. In addition, a slot in the checksum array is reserved by thread 770. As shown in FIG. 7C, thread 770 reserves the space 704 while holding the strand lock. Once the space 704 has been reserved, the strand lock will be released by thread 770, as shown in FIG. 7D. Thread 770 will continue holding onto the checksum slot 1 until it has completed generating a log record and checksum.

Turning to FIG. 7E, this figure illustrates thread 772 beginning the process of generating a log record. The strand lock is acquired by thread 772 so that thread 772 can reserve space within block 700 to copy a log record. In addition, the checksum slot2 is reserved by thread 772 that also acquires the strand lock. FIG. 7F further illustrates that thread 772 reserves the space 706 in block 700 and acquires the strand lock that is released as illustrated in FIG. 7G.

FIG. 7H shows thread 770 copying the log record R1 into space 704 within block 700. This figure also shows thread 772 copying the log record R2 into space 706 within block 700.

Figure 7I:
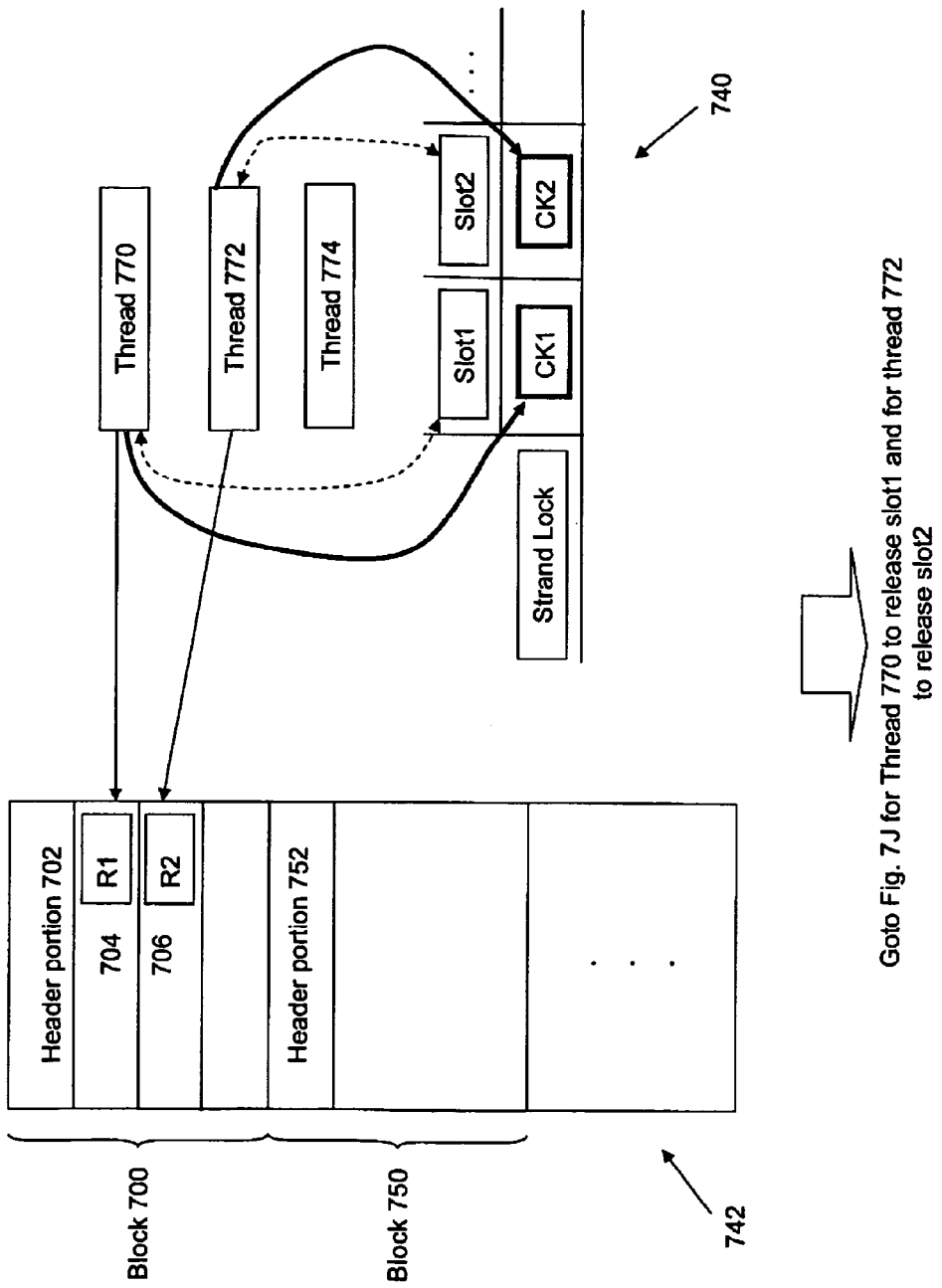

As shown in FIG. 7I, after each thread has copied the new log record into the block, a checksum of the new log record will also be calculated and placed within the array 740. Here, the checksum CK1 for log record R1 will be calculated and placed in the slot 1 of the array 740. Similarly, the checksum CK2 for log record R2 will be calculated and placed in the slot 2 of the array 740.

Figure 7J:
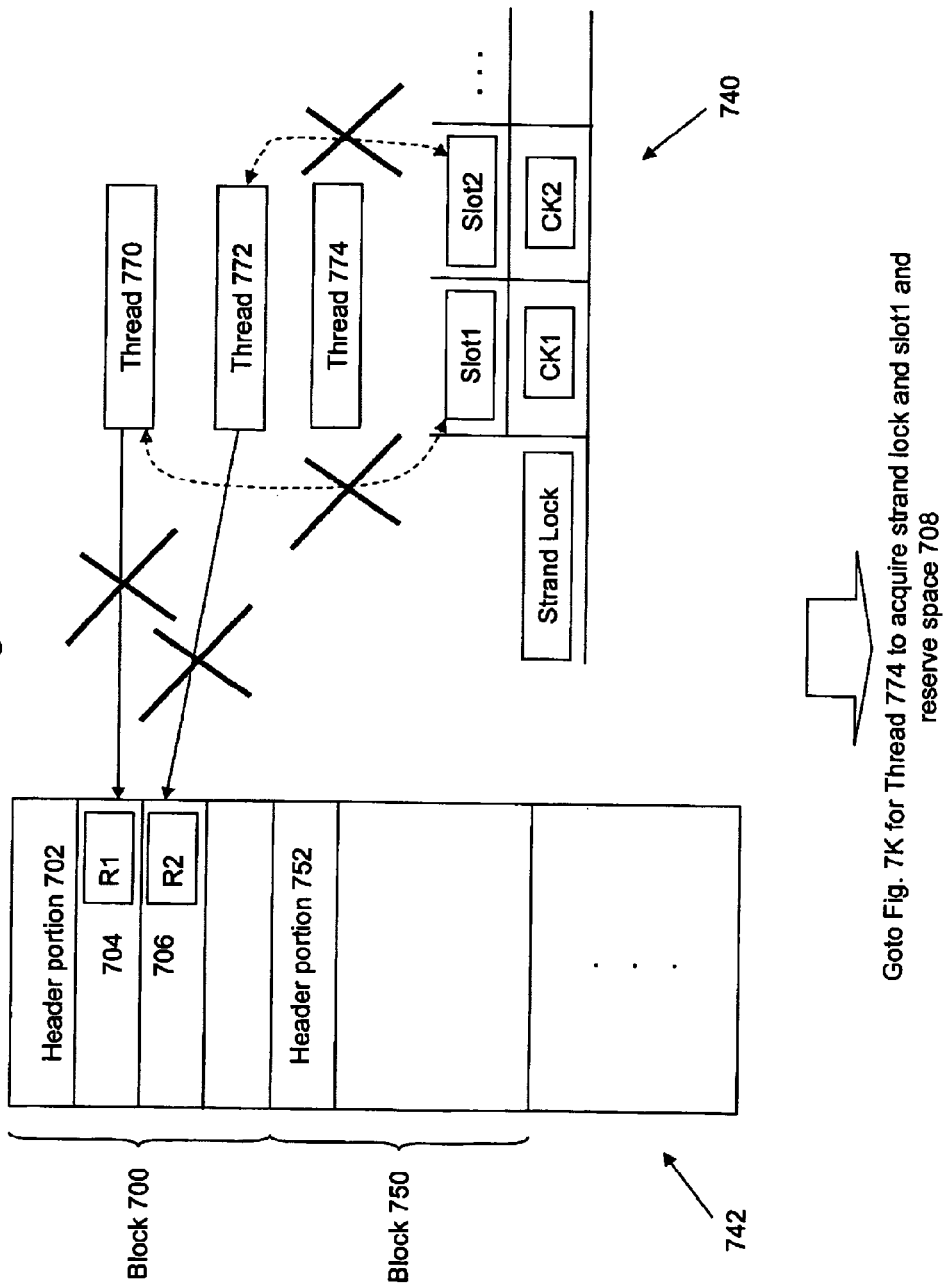

Since threads 770 and 772 have completed their work in generating the records and checksums, they release the slots in the array, as shown in FIG. 7J. This is because these checksum slots are no longer needed, since their respective log records for threads 770 and 772 have already been copied to the block 700 and the checksums have also been generated.

At this point, the checksum for the block 700 does not yet exist in the header 702. However, the checksums CK1 and CK2 for individual records R1 and R2, respectively, have been created and are stored within the array 740. This means that if there is any subsequent corruption of these log records, the corruption can be detected by checking the checksum values CK1 or CK2.

Figure 7L:
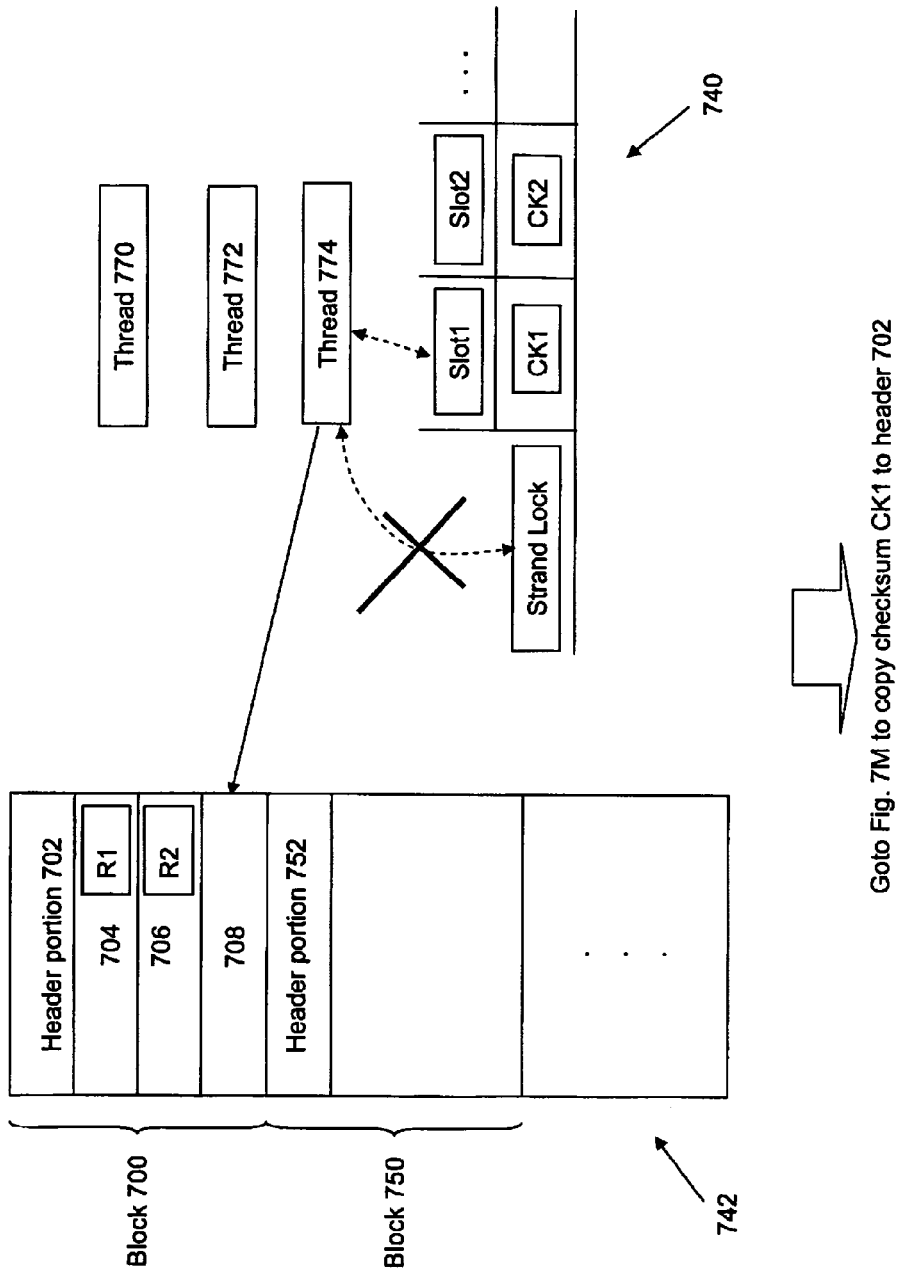

Turning to FIG. 7K, this figure illustrates thread 774 beginning the process of generating another log record for block 700. Thread 774 takes the strand lock and allocates space within block 700 to copy a new log record. Since checksum slot 1 has been released by thread 770, it is free to be acquired by thread 774. Therefore, checksum slot 1 is now acquired by thread 774. Thread 774 reserves space 708 in block 700. As shown in FIG. 7L, once the space 708 has been reserved, the strand lock will be released by thread 774. Thread 774 will continue holding onto checksum slot 1 until it has completed generating a log record and checksum.

At this point, thread 774 inspects the array 740 and determines that there is already a pre-existing checksum value in the checksum slot 1. Since checksum slot 1 was available to be acquired by thread 774, this means that the previous holder (i.e., thread 770) of the checksum slot 1 must have completed its processing. Therefore, the checksum value CK1 in the checksum slot 1 is ready to be placed into the header 702 for the block 700. A determination is made whether there is already a pre-existing checksum value for the block in the header portion 702. At this point, there is no pre-existing checksum value for the block. Therefore, as shown in FIG. 7M, the checksum value CK1 is copied into the header 702 as the current state of the checksum value for the entire block.

Figure 7O:
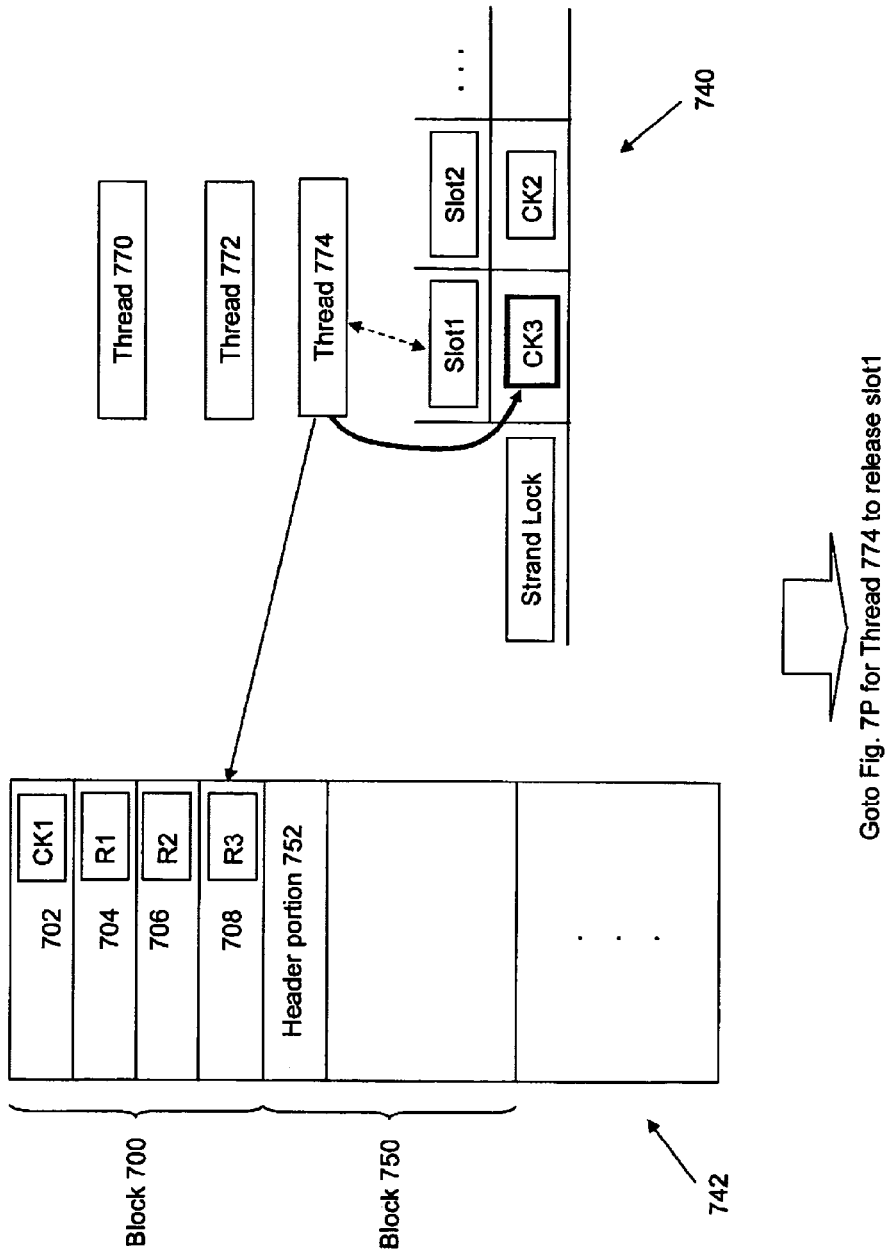
Figure 7Q:
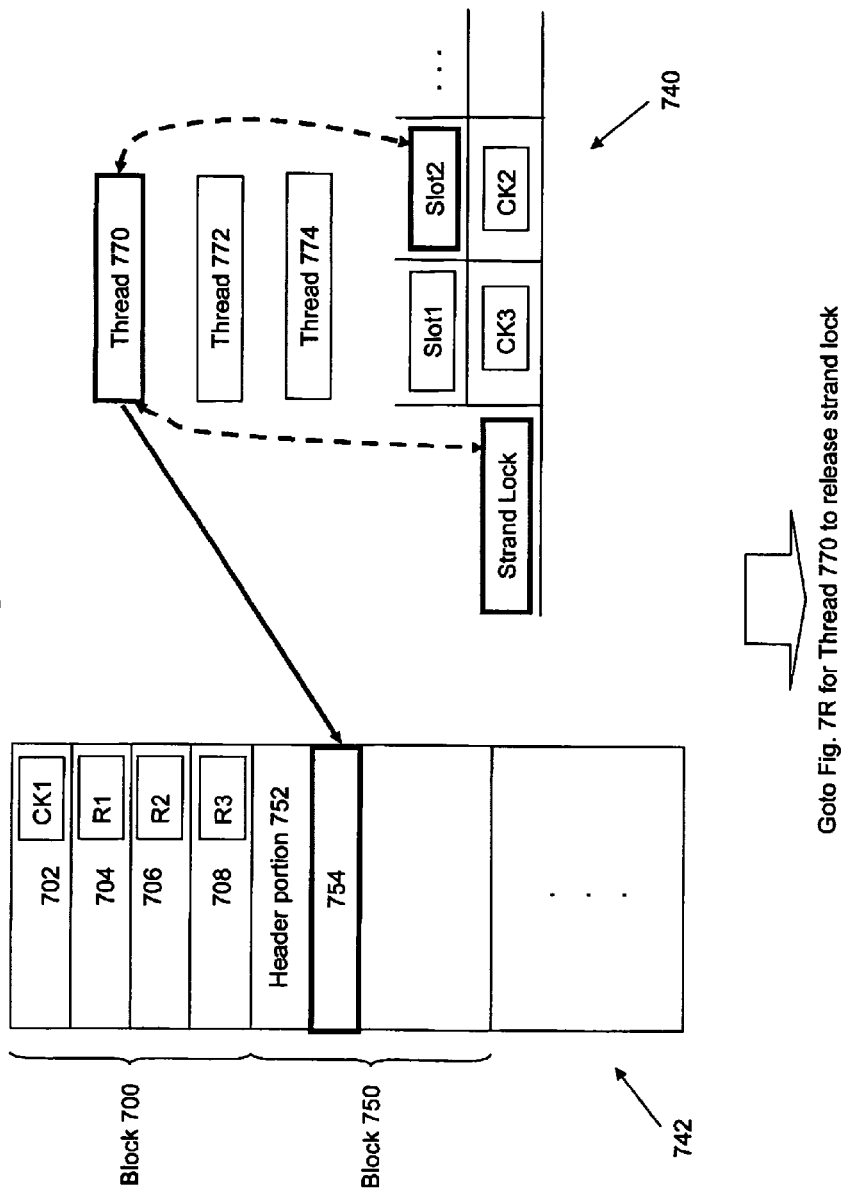
Figure 7R:
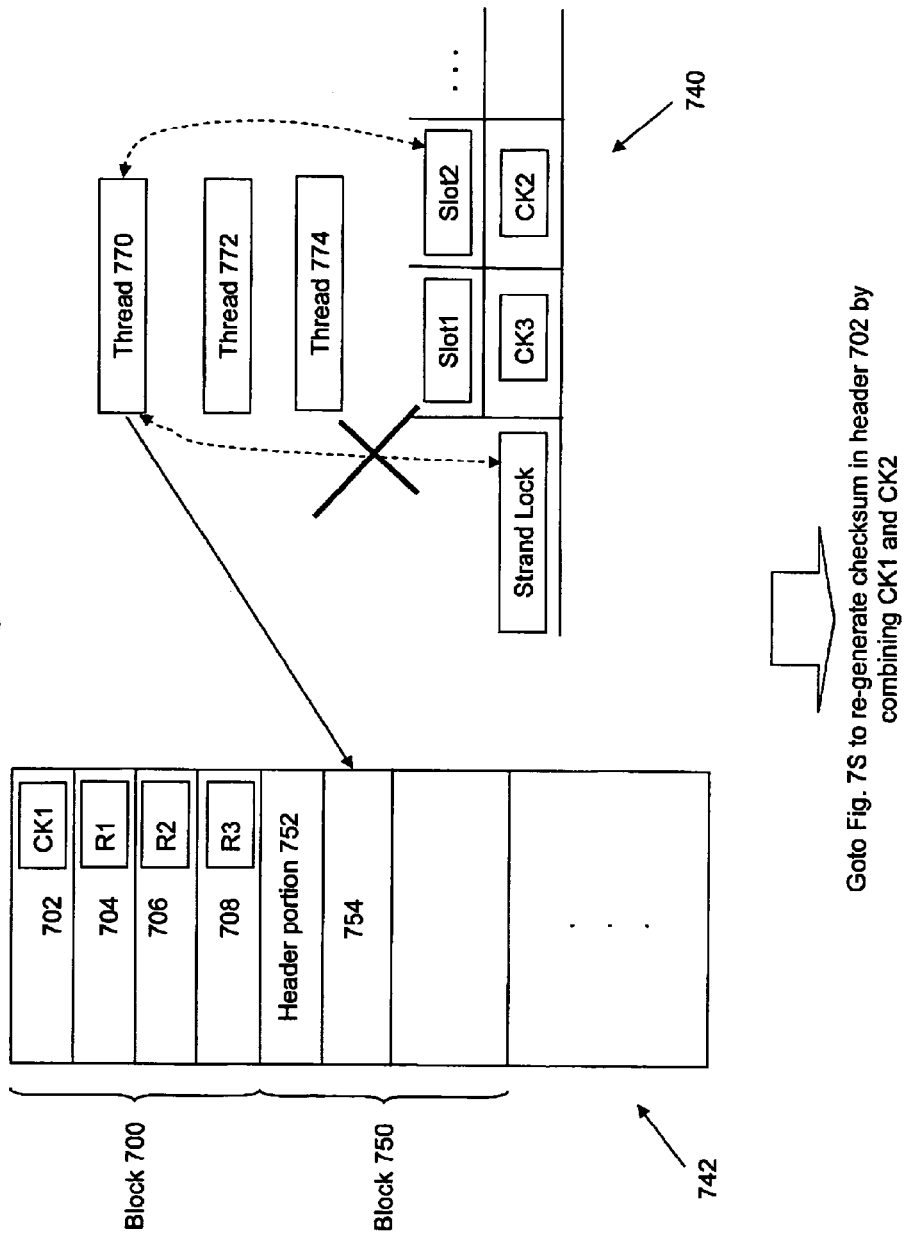

At this point, as shown in FIG. 7N, thread 774 copies a new log record R3 into space 708 in block 700. In FIG. 7O, this figure illustrates thread 774 generating a new checksum CK3 for the log record R3, and placing this checksum value CK3 in the checksum slot 1 in the array 740. Thereafter, as shown in FIG. 7P, the checksum slot 1 can be released by thread 774. At this point, as shown in FIG. 7Q, another thread, such as thread 770, acquires the strand lock and reserves the checksum slot 2 to begin the process of generating another log record—this time for block 750. It is noted that blocks 700 and 750 are both within the same strand 742, and hence their space allocation is protected by the same strand lock. Since the checksum slot 2 was previously released by thread 772, it is free to be re-acquired by thread 770. Therefore, the checksum slot 2 is now acquired by thread 770. Thread 770 reserves space 754 in block 750. Once the space 754 has been reserved, the strand lock will be released by thread 770 as shown in FIG. 7R. Thread 770 will continue holding onto the checksum slot 2 until it has completed generating a log record and checksum.

At this point, thread 770 inspects the array 740 and determines that there is already a pre-existing checksum value in the checksum slot 2. Since the checksum slot 2 was available to be acquired by thread 770, this means that the previous holder (i.e., thread 772) of the checksum slot 2 must have completed its processing. Therefore, the checksum value CK2 in the checksum slot 2 is ready to be placed into the header 702 for the block 700.

Figure 7S:
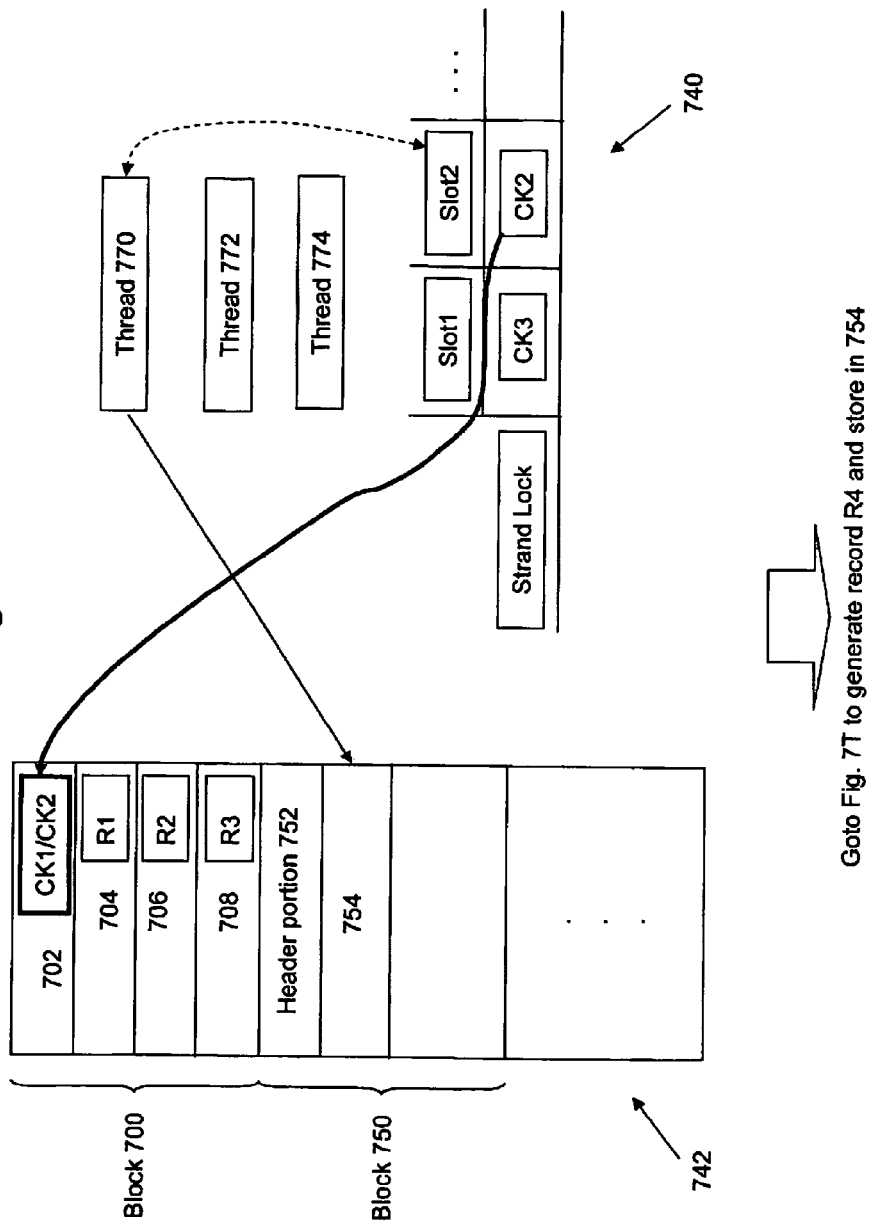

A determination is made whether there is already a pre-existing checksum value for the block in the header. Here, as shown in header 702, there is already a pre-existing checksum value (CK1) for the block. Since there is already a preexisting checksum value for the block, the pre-existing checksum value (CK1) will be aggregated/combined with the checksum value (CK2) from the checksum slot 2. Therefore, as shown in FIG. 7S, the header 702 at this point now has an aggregated checksum value CK1/CK2 that represents two of the log records (R1 and R2) that have been copied into the block 700.

According to some embodiments, the aggregated checksum value CK1/CK2 for the block is combined in such a way such that the size of the resulting checksum does not increase or does not significantly increase. For example, if the individual checksums CK1 and CK2 are unsigned 2-byte values, then an aggregation will result in an aggregated checksum CK1/CK2 that is still an unsigned 2-byte value.

Figure 7U:
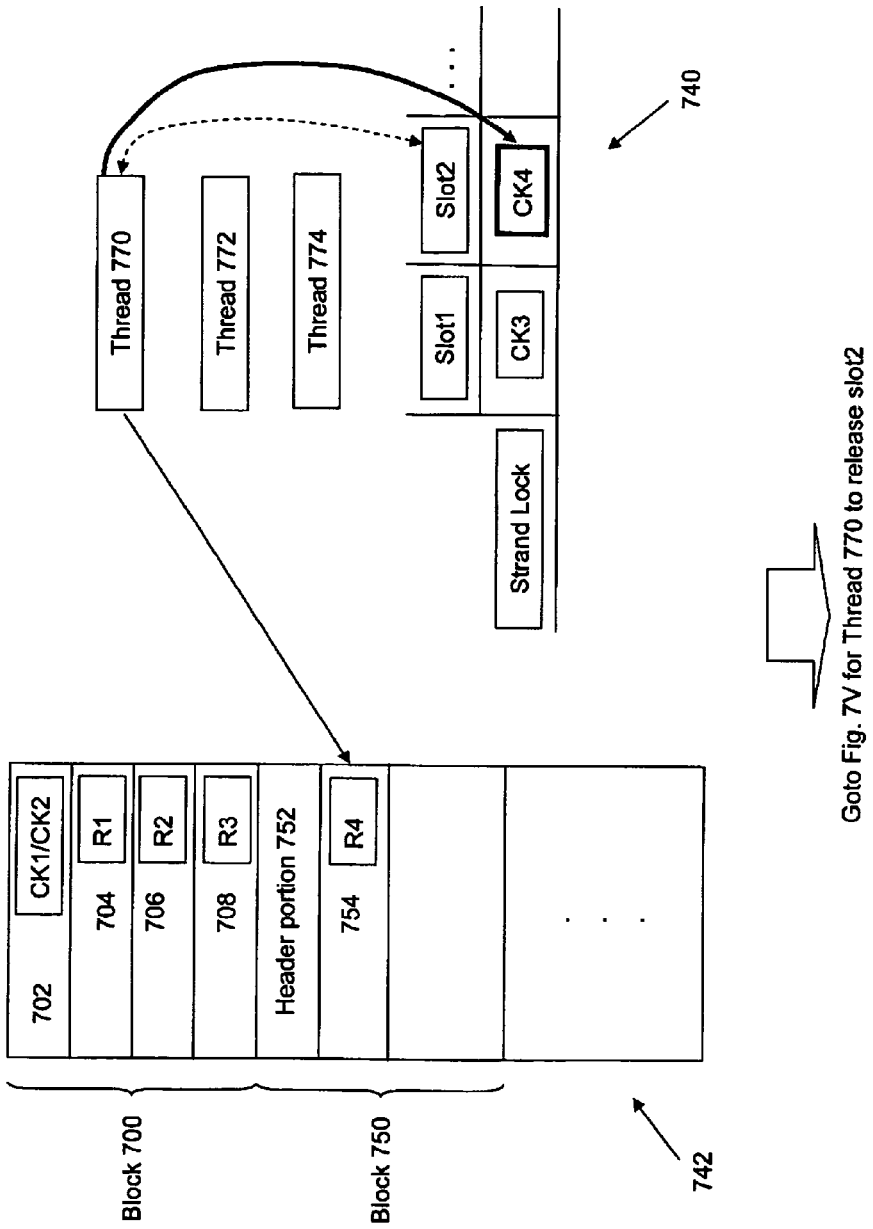
Figure 7V:
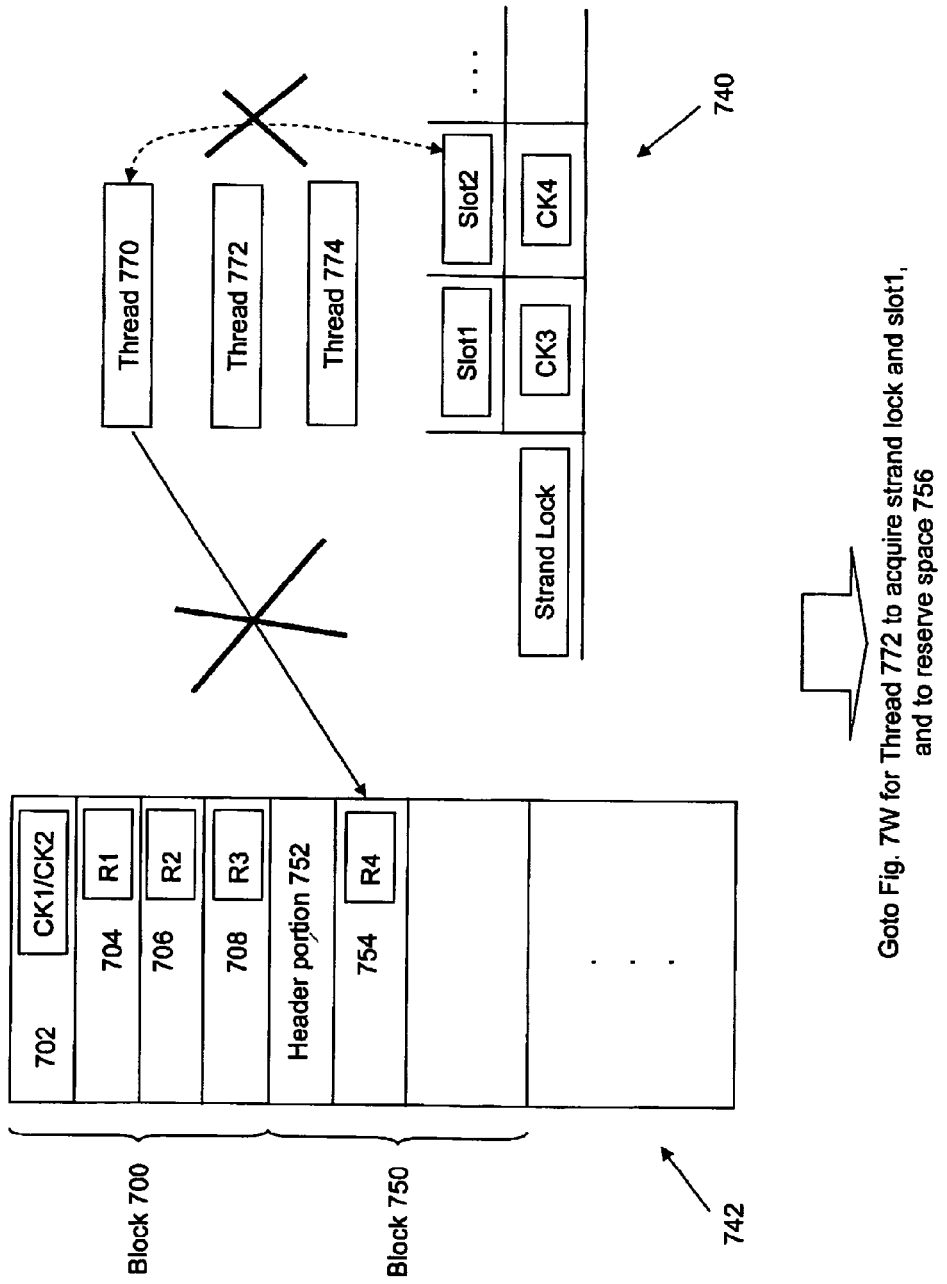

Next, as shown in FIG. 7T, thread 770 copies a new log record R4 into space 754 in block 750. FIG. 7U illustrates thread 770 generating a new checksum CK4 for the log record R4, and placing this checksum value CK4 in the checksum slot 2 in the array 740. Thereafter, as shown in FIG. 7V, the checksum slot 2 can be released by thread 770.

Figure 7X:
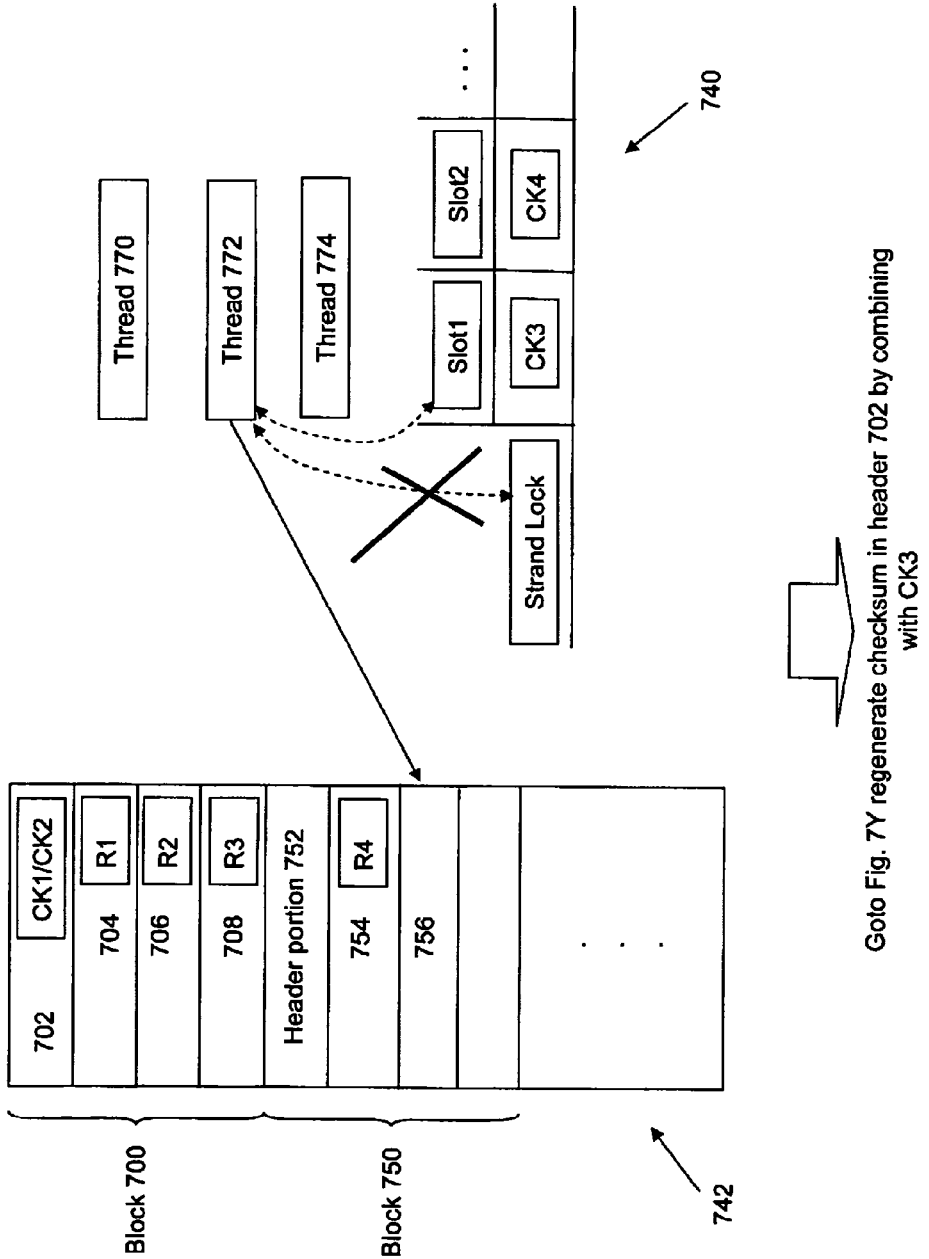

As shown in FIG. 7W, thread 772 acquires the strand lock and the checksum slot 1 to begin the process of generating another log record for block 750. Since the checksum slot 1 was previously released by thread 774, it is free to be re-acquired by thread 772. Therefore, the checksum slot 1 is now acquired by thread 772. Thread 772 reserves space 756 in block 750. Once the space 756 has been reserved, the strand lock will be released by thread 772 as shown in FIG. 7X. Thread 772 will continue holding onto the checksum slot 1 until it has completed generating a log record and checksum.

At this point, thread 772 inspects the array 740 and determines that there is already a pre-existing checksum value in the checksum slot 1. Since the checksum slot 1 was available to be acquired by thread 772, this means that the previous holder (i.e., thread 774) of the checksum slot 1 must have completed its processing. Therefore, the checksum value CK3 in the checksum slot 1 is ready to be placed into the header 702 for the block 700.

Figure 7Y:
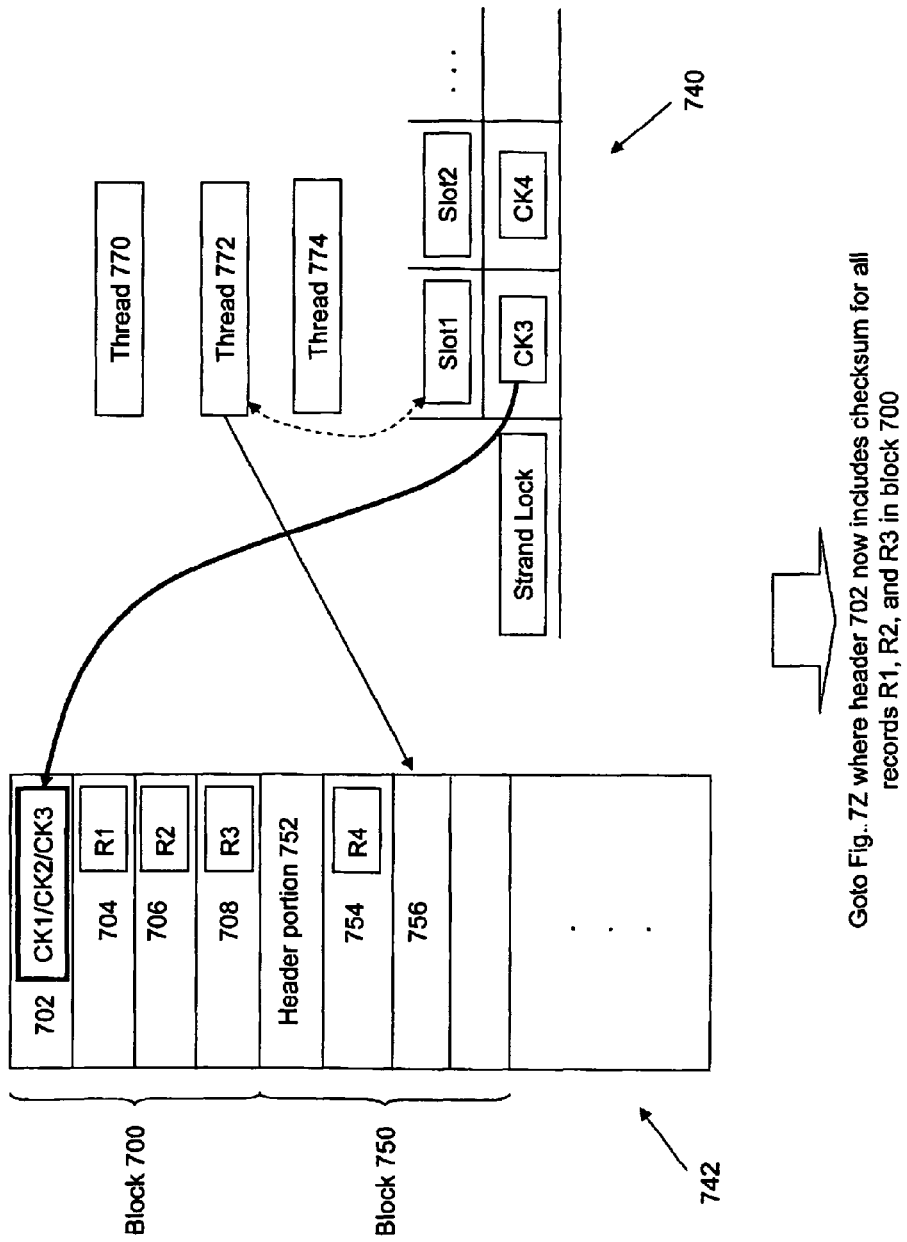

A determination is made whether there is already a pre-existing checksum value for the block. Here, as shown in header 702, there is already a pre-existing checksum value (CK1/CK2) for the block based upon the checksums for records R1 and R2. Since there is already a pre-existing checksum value for the block, the pre-existing checksum value (CK1/CK2) will be aggregated/combined with the checksum value (CK3) from the checksum slot 1. Therefore, as shown in FIG. 7Y, the header 702 at this point now has an aggregated checksum value CK1/CK2/CK3 that represents all three of the log records (R1, R2, R3) that make up block 700.

Figure 7Z:
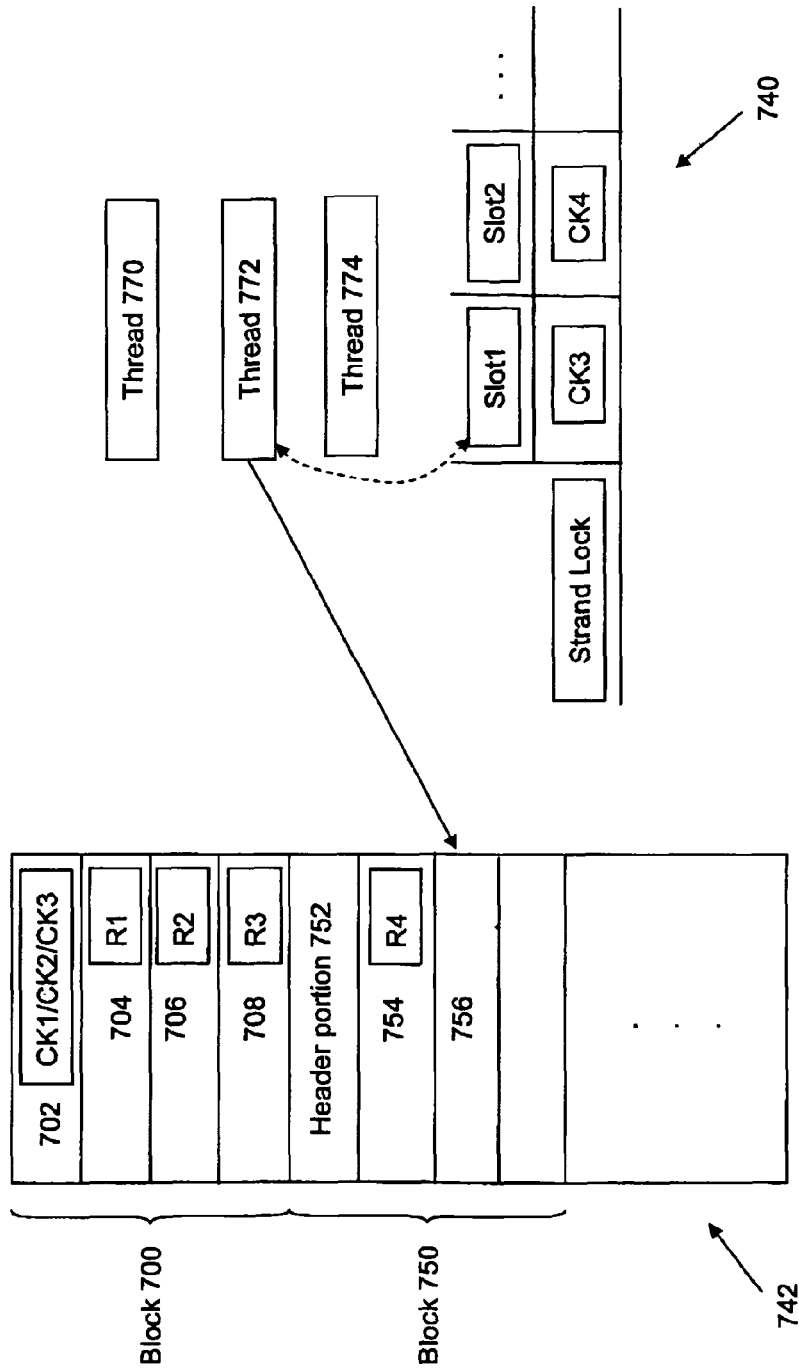

At this point, as shown in FIG. 7Z, the checksum for the log records within block 700 is complete. A subsequent action can be taken to update the block's checksum based upon any additional information that is placed into the block header.

Therefore, what has been described is an improved approach for integrity validation and other transformations of ordered records. The present solution is advantageous since it can provide end-to-end robustness of ordered record data integrity. The ordered records are checksummed immediately at the source upon generation. Those checksums are later written to persistent storage for subsequent validation inside the disk and other nonvolatile memory (e.g., as described in U.S. Patent Publication 2002/0049950 and U.S. Pat. No. 7,020,835, which are hereby incorporated by reference in their entirety). In addition, the present solution has very efficient distribution of computationally expensive checksum operations, and provides for concurrency in performing checksum computations. The present approach provides better cache locality and efficiency for the checksum computation because the record generators already have the record data readily available in their local cache lines during the record copy while computing the checksums. Finally, unlike the approach of a single checksum calculator that may pollute the cache lines of its local processor, the present solution has better and more friendly cache sharing between multiple processes/threads running on the same processor, resulting in less cache misses or memory stalls.

Importantly, the present invention allows for early detection of ordered record corruptions and prevention of corruptions from being written to persistent storage. In the case of redo logs, it is now possible to detect in-memory redo record corruptions before writing the redo to persistent storage. Without the present solution, a corrupted redo block may be written to disk.

In addition, each checksum generated by the record generator may serve as parity bits for the respective record. The present solution provides a general mechanism to guarantee the integrity of ordered records residing in shared memory.

In an alternative embodiment, the invention can be implemented such that certain data units have checksum calculations performed using the above approach, while other data units have checksums determined by a central process, e.g., a log writer process. For example, using this approach, record generators only checksum a data unit (i.e., block) if it is entirely occupied by one record and delegate the work of performing checksum calculations for the rest data units to a third party process/thread, such as the record writer. This type of approach provides some ease of implementation and is less optimal than the approach discussed above.

In another alternative embodiment, record generators compute the checksums of their own records. They do not aggregate checksums within a shared data unit. Prior to writing the data units to persistent storage, a third party process/thread, such as the record writer, aggregates the checksum for each data unit.

In yet another embodiment, the record generators compute the checksums of their own records. They do not aggregate checksums within a shared data unit. Both the ordered records and their respective checksums are written to persistent storage. Each record can be later validated using its own checksum- This solution performs more fine-grained validation, but incurs additional storage overhead.

It is possible that the present fine-grained checksum approach may not utilize certain hardware checksum capability. For example, the hardware checksum may not work if the record size is not power of 2 or if the record is not aligned. To address this issue, the data record can be "padded" to create the correct alignment for the hardware capabilities.

System Architecture Overview

Figure 8:
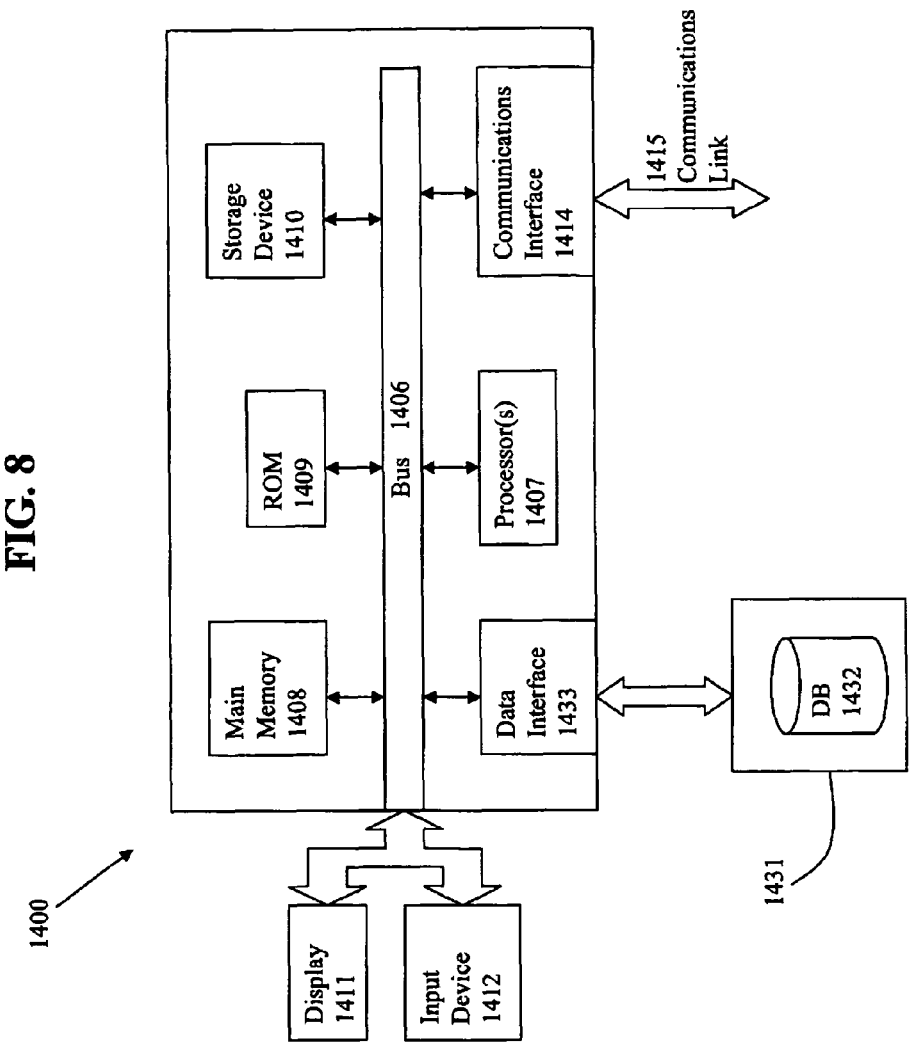
FIG. 8 shows an architecture of an example computing system with which the invention may be implemented.

FIG. 8 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A computer implemented method for transforming data records, comprising:
using at least one processor that executes one or more processing entities and is configured or programmed for performing a process, the process comprising:
identifying a data unit;
generating a first record and a second record to place into the data unit;
generating multiple checksums in parallel for the first record and the second record, wherein after generating the first and second records but before respective placement of the first and second records in the data unit:
generating a first checksum from the first record, and a second checksum from the second record, in which the first and second checksums are generated in parallel for the first and second records to be stored within the data unit;
storing the first and second checksums in a holding data structure configured to hold a plurality of checksums;
persistently storing the first record and the second record in the data unit; and combining the multiple checksums into a combined checksum, wherein the combined checksum corresponds to an aggregate checksum for the data unit that comprises at least the first checksum and the second checksum from the holding data structure, and wherein the first record and the second record are persistently stored in the data unit with the aggregate checksum for the data unit.

2. The computer implemented method of claim 1 in which the data records comprise database log records.

3. The computer implemented method of claim 1 in which the first and second checksums are additive or commutative.

4. The computer implemented method of claim 1 in which the first and second checksums provide data integrity checks.

5. The computer implemented method of claim 1 in which a data record undergoes compression or encryption.

6. The computer implemented method of claim 1 in which a data record undergoes at least two of encryption; compression; and checksum.

7. The computer implemented method of claim 1 in which, when the aggregate checksum does not have a pre-existing value, a previously stored checksum is copied to the aggregate checksum.

8. The computer implemented method of claim 1 in which a previously stored checksum is aggregated with a pre-existing checks=value of the aggregate checksum for the data unit.

9. The computer implemented method of claim 1 in which the aggregate checksum for the data unit is stored within a header for the data unit.

10. The computer implemented method of claim 1 in which the first and second checksums are aggregated.

11. The computer implemented method of claim 10 in which a later record generator aggregates the first and second checksums.

12. The computer implemented method of claim 10 in which the first checksum is generated by a first record generator, the second checksum is generated by a second record generator, and the first and second checksums are aggregated by another entity.

13. The computer implemented method of claim 1 in which the first and second checksums are retained in un-aggregated states.

14. The computer implemented method of claim 1, the process further comprising:
determining integrity of content of the data unit using at least the first checksum or the second checksum before storing the content of the data unit in a persistent storage.

15. The computer implemented method of claim 1, in which the generating the first record to place into the data unit comprises:
invoking a strand lock to reserve a first part of a strand in the data unit, to ensure exclusive use of the first part of the strand in the data unit for the first record; and
the generating the second record to place into the data unit comprises:
invoking the strand lock to reserve a second part of the strand or of another strand in the data unit, to ensure exclusive use of the second part of the strand or of the another strand in the data unit for the second record.

16. The computer implemented method of claim 1, in which storing the first and second checksums in the holding data structure comprises:
identifying a slot in the holding data structure for the first checksum or the second checksum;
determining whether the slot includes a previously stored checksum;
aggregating the previously stored checksum into the aggregated checksum for the data unit; and
storing the first checksum or the second checksum in the slot.

17. A system for transforming data records, comprising:
at least one processor that is at least to:
identify a data unit;
generate a first record and a second record to place into the data unit;
generating multiple checksums in parallel for the first record and the second record, wherein after the first and second records are generated but before respective placement of the first and second records in the data unit:
generate a first checksum from the first record, and a second checksum from the second record, in which the first and second checksums are generated in parallel for the first and second records to be stored within the data unit;
store the first and second checksums in a holding data structure configured to hold a plurality of checksums;
persistently store the first record and the second record in the data unit; and
combining the multiple checksums into a combined checksum, wherein the combined checksum corresponds to an aggregate checksum for the data unit that comprises at least the first checksum and the second checksum from the holding data structure, and wherein the first record and the second record are persistently stored in the data unit with the aggregate checksum for the data unit.

18. The system of claim 17 in which the data records comprise database log records.

19. The system of claim 17 in which the first and second checksums are additive or commutative.

20. The system of claim 17 in which the first and second checksums provide data integrity checks.

21. The system of claim 17 in which a data record undergoes compression or encryption.

22. The system of claim 17 in which a data record undergoes at least two of encryption, compression, and checksum.

23. The system of claim 17 in which, when the aggregate checksum does not have a pre-existing value, a previously stored checksum is copied to the aggregate checksum.

24. The system of claim 17 in which a previously stored checksum is aggregated with a pre-existing checksum value of the aggregate checksum for the data unit.

25. The system of claim 17 in which the aggregate checksum for the data unit is stored within a header for the data unit.

26. The system of claim 17 in which the first and second checksums are aggregated.

27. The system of claim 26 in which a later record generator aggregates the first and second checksums.

28. The system of claim 26 in which the first checksum is generated by a first record generator, the second checksum is generated by a second record generator, and the first and second checksums are aggregated by another entity.

29. The system of claim 17 in which the first and second checksums are retained in un-aggregated states.

30. A computer program product that includes a non-transitory computer readable storage medium, the non-transitory computer readable storage medium comprising a plurality of computer instructions which, when executed by at least one processor, cause the at least one processor to perform a method for transforming data records, the method comprising:
using the at least one processor that is configured or programmed to implement a process, the process comprising:
identifying a data unit;

generating a first record and a second record to place into the data unit;

generating multiple checksums in parallel for the first record and the second record, wherein after generating the first and second records but before respective placement of the first and second records in the data unit:

generating a first checksum from the first record, and a second checksum from the second record, in which the first and second checksums are generated in parallel for the first and second records to be stored within the data unit;

storing the first and second checksums in a holding data structure configured to hold a plurality of checksums;

persistently storing the first record and the second record in the data unit; and combining the multiple checksums into a combined checksum, wherein the combined checksum corresponds to an aggregate checksum for the data unit that comprises at least the first checksum and the second checksum from the holding data structure, and wherein the first record and the second record are persistently stored in the data unit with the aggregate checksum for the data unit.

31. The computer program product of claim 30 in which the data records comprise database log records.

32. The computer program product of claim 30 in which the first and second checksums are additive or commutative.

33. The computer program product of claim 30 in which the first and second checksums provide data integrity checks.

34. The computer program product of claim 30 in which a data record undergoes compression or encryption.

35. The computer program product of claim 30 in which a data record undergoes at least two of encryption, compression, and checksum.

36. The computer program product of claim 30 in which, when the aggregate checksum does not have a pre-existing value, a previously stored checksum is copied to the aggregate checksum.

37. The computer program product of claim 30 in which a previously stored checksum is aggregated with a pre-existing checksum value of the aggregate checksum for the data unit.

38. The computer program product of claim 30 in which the aggregate checksum for the data unit is stored within a header for the data unit.

39. The computer program product of claim 30 in which the first and second checksums are aggregated.

40. The computer program product of claim 39 in which a later record generator aggregates the first and second checksums.

41. The computer program product of claim 39 in which the first checksum is generated by a first record generator, the second checksum is generated by a second record generator, and the first and second checksums are aggregated by another entity.

42. The computer program product of claim 30 in which the first and second checksums are retained in un-aggregated states.

* * * * *

UNITED STATES PATENT AND TRADEMARK OFFICE
CERTIFICATE OF CORRECTION

| | | |
|---|---|---|
| PATENT NO. | : 9,104,662 B2 | |
| APPLICATION NO. | : 12/188521 | |
| DATED | : August 11, 2015 | |
| INVENTOR(S) | : Srihari et al. | |

It is certified that error appears in the above-identified patent and that said Letters Patent is hereby corrected as shown below:

On title page, column 2, under Other Publications, line 6, delete "Peformance" and insert -- Performance --, therefor.

On title page, column 2, under Other Publications, line 9, delete "etl" and insert -- et --, therefor.

On page 2, column 1, under Other Publications, line 21, delete "Wasington," and insert -- Washington, --, therefor.

On page 2, column 2, under Other Publications, line 25, delete "Guranteed" and insert -- Guaranteed --, therefor.

On page 2, column 2, under Other Publications, line 36, delete "Acces" and insert -- Access --, therefor.

On page 2, column 2, under Other Publications, line 37, delete "Univerisity" and insert -- University --, therefor.

In the specification,

In column 2, line 37, delete "fiends" and insert -- funds --, therefor.

In column 5, line 25, delete "slot" and insert -- slot, --, therefor.

In column 6, line 19, delete "FIGS. 7 A-Z" and insert -- FIGS. 7A-Z --, therefor.

In column 6, line 21, delete "FIG. 7 A" and insert -- FIG. 7A --, therefor.

In column 6, line 40, delete "slot 1" and insert -- slot1 --, therefor.

Signed and Sealed this
Twenty-eighth Day of June, 2016

Michelle K. Lee
*Director of the United States Patent and Trademark Office*

CERTIFICATE OF CORRECTION (continued)

In column 6, line 53, delete "FIG. 71," and insert -- FIG. 7I, --, therefor.

In column 6, line 57, delete "slot 1" and insert -- slot1 --, therefor.

In column 6, lines 58-59, delete "slot 2" and insert -- slot2 --, therefor.

In column 7, line 10, delete "slot 1" and insert -- slot1 --, therefor.

In column 7, line 11, delete "slot 1" and insert -- slot1 --, therefor.

In column 7, line 15, delete "slot 1" and insert -- slot1 --, therefor.

In column 7, line 20, delete "slot 1." and insert -- slot1. --, therefor.

In column 7, line 20, delete "slot 1" and insert -- slot1 --, therefor.

In column 7, line 22, delete "slot 1" and insert -- slot1 --, therefor.

In column 7, line 24, delete "slot 1" and insert -- slot1 --, therefor.

In column 7, line 32, delete "FIG. 70," and insert -- FIG. 7O, --, therefor.

In column 7, line 35, delete "slot 1" and insert -- slot1 --, therefor.

In column 7, line 36, delete "slot 1" and insert -- slot1 --, therefor.

In column 7, lines 36-49, after "774." delete "At this point,……record and checksum." and insert the same on col. 7, line 37, as a new paragraph.

In column 7, lines 38-39, delete "slot 2" and insert -- slot2 --, therefor.

In column 7, lines 42-43, delete "slot 2" and insert -- slot2 --, therefor.

In column 7, line 44, delete "slot 2" and insert -- slot2 --, therefor.

In column 7, line 48, delete "slot 2" and insert -- slot2 --, therefor.

In column 7, line 52, delete "slot 2." and insert -- slot2. --, therefor.

In column 7, line 52, delete "slot 2" and insert -- slot2 --, therefor.

In column 7, line 54, delete "slot 2" and insert -- slot2 --, therefor.

In column 7, line 56, delete "slot 2" and insert -- slot2 --, therefor.

CERTIFICATE OF CORRECTION (continued)
U.S. Pat. No. 9,104,662 B2

In column 7, line 64, delete "slot 2." and insert -- slot2. --, therefor.

In column 8, line 12, delete "slot 2" and insert -- slot2 --, therefor.

In column 8, line 13, delete "slot 2" and insert -- slot2 --, therefor.

In column 8, line 15, delete "slot 1" and insert -- slot1 --, therefor.

In column 8, line 16, delete "slot 1" and insert -- slot1 --, therefor.

In column 8, line 18, delete "slot 1" and insert -- slot1 --, therefor.

In column 8, line 22, delete "slot 1" and insert -- slot1 --, therefor.

In column 8, line 26, delete "slot 1." and insert -- slot1. --, therefor.

In column 8, line 26, delete "slot 1" and insert -- slot1 --, therefor.

In column 8, line 28, delete "slot 1" and insert -- slot1 --, therefor.

In column 8, line 30, delete "slot 1" and insert -- slot1 --, therefor.

In column 8, line 39, delete "slot 1." and insert -- slot1. --, therefor.

In column 9, lines 37-38, delete "checksum-" and insert -- checksum. --, therefor.

In the claims,

In column 11, line 25, in Claim 8, delete "checks=value" and insert -- checksum value --, therefor.